United States Patent
Manahan et al.

(10) Patent No.: US 11,239,652 B2
(45) Date of Patent: Feb. 1, 2022

(54) COMPLIANT, HAZARDOUS ENVIRONMENT CIRCUIT PROTECTION DEVICES, SYSTEMS AND METHODS

(71) Applicant: EATON INTELLIGENT POWER LIMITED, Dublin (IE)

(72) Inventors: Joseph Michael Manahan, Manlius, NY (US); Adam Ledgerwood, Syracuse, NY (US); Andrew Butler, Baldwinsville, NY (US); Graig DeCarr, Cicero, NY (US); Edmund Leubner, Liverpool, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 214 days.

(21) Appl. No.: 16/723,374

(22) Filed: Dec. 20, 2019

(65) Prior Publication Data
US 2020/0212666 A1 Jul. 2, 2020

Related U.S. Application Data

(60) Provisional application No. 62/784,965, filed on Dec. 26, 2018.

(51) Int. Cl.
*H02H 5/04* (2006.01)
*H01H 71/02* (2006.01)

(52) U.S. Cl.
CPC ............ *H02H 5/047* (2013.01); *H01H 71/02* (2013.01)

(58) Field of Classification Search
CPC .............................. H02H 5/047; H01H 71/102
USPC ........................................................ 361/103
See application file for complete search history.

(56) References Cited

U.S. PATENT DOCUMENTS

| | | | |
|---|---|---|---|
| 3,493,783 | A | 2/1970 | Till |
| 3,569,820 | A | 3/1971 | Nishimuta et al. |
| 3,644,790 | A | 2/1972 | Kozlovic et al. |
| 3,656,005 | A | 4/1972 | Lee |
| 3,809,985 | A | 5/1974 | Krause et al. |
| 4,115,829 | A | 9/1978 | Howell et al. |
| 4,129,785 | A | 12/1978 | Kadah |
| 4,366,463 | A | 12/1982 | Barker et al. |
| 4,599,675 | A | 7/1986 | Fisher et al. |
| 4,710,645 | A | 12/1987 | Doittau et al. |

(Continued)

FOREIGN PATENT DOCUMENTS

| | | |
|---|---|---|
| AU | 502105 B2 | 7/1979 |
| CA | 1292553 C | 11/1991 |

(Continued)

OTHER PUBLICATIONS

PCT International Search Report and Written Opinion, Application No. PCT/US2019/068554, dated Mar. 9, 2020, 14 pps.

*Primary Examiner* — Kevin J Comber
(74) *Attorney, Agent, or Firm* — Armstrong Teasdale LLP

(57) ABSTRACT

Solid state and hybrid circuit protection devices include improved arc-less switching capability and overcurrent protection, improved terminal assemblies and improved thermal management features that reduce or eliminate ignition sources for hazardous environments. The solid state and hybrid circuit protection devices are ignition protected and avoid possible explosions and therefore obviate a need for conventional explosion-proof enclosures to ensure safe operation of an electrical power system in hazardous locations.

16 Claims, 12 Drawing Sheets

(56) References Cited

U.S. PATENT DOCUMENTS

| | | |
|---|---|---|
| 4,713,719 A | 12/1987 | Kugelman et al. |
| 4,740,883 A | 4/1988 | McCollum |
| 5,508,655 A | 4/1996 | Cederlind et al. |
| 5,818,674 A | 10/1998 | Zuzuly |
| 5,903,139 A | 5/1999 | Kompelien |
| 6,051,895 A | 4/2000 | Mercier |
| 6,127,882 A | 10/2000 | Vargha et al. |
| 6,426,632 B1 | 7/2002 | Clunn et al. |
| 6,515,840 B2 | 2/2003 | Covi et al. |
| 6,603,221 B1 | 8/2003 | Liu |
| 7,304,828 B1 | 12/2007 | Shvartsman |
| 7,323,851 B2 | 1/2008 | Markowski |
| 7,369,386 B2 | 5/2008 | Rasmussen et al. |
| 7,436,642 B2 | 10/2008 | Grisoni |
| 7,468,877 B2 | 12/2008 | Oki et al. |
| 7,643,256 B2 | 1/2010 | Wright et al. |
| 7,656,103 B2 | 2/2010 | Shteynberg et al. |
| 7,669,061 B2 | 2/2010 | Curt et al. |
| 7,742,273 B1 | 6/2010 | Shvartsman et al. |
| 7,755,414 B2 | 7/2010 | Shvartsman |
| 7,787,223 B2 | 8/2010 | Bilac |
| 7,933,126 B2 | 4/2011 | Jain |
| 7,936,541 B2 | 5/2011 | Brusky et al. |
| 8,023,235 B2 | 9/2011 | Bilac et al. |
| 8,213,144 B2 | 7/2012 | Papallo et al. |
| 8,335,062 B2 | 12/2012 | Haines et al. |
| 8,405,939 B2 | 3/2013 | Haines et al. |
| 8,643,308 B2 | 2/2014 | Grajcar |
| 8,687,392 B2 | 4/2014 | Sims et al. |
| 8,779,676 B2 | 7/2014 | Simi |
| 8,853,958 B2 | 10/2014 | Athalye et al. |
| 9,000,678 B2 | 4/2015 | Huynh |
| 9,093,863 B2 | 7/2015 | Hyde et al. |
| 9,276,401 B2 | 3/2016 | Rozman et al. |
| 9,531,215 B2 | 12/2016 | Ewing et al. |
| 9,557,723 B2 | 1/2017 | Nasle |
| 9,642,226 B2 | 5/2017 | Taipale et al. |
| 9,736,911 B2 | 8/2017 | Taipale et al. |
| 9,755,630 B2 | 9/2017 | Urciuoli |
| 10,079,122 B2 | 9/2018 | Kinsel et al. |
| 10,320,177 B2 | 6/2019 | Emerson et al. |
| 2003/0218847 A1 | 11/2003 | Lesesky et al. |
| 2006/0116794 A1 | 6/2006 | Stoupis et al. |
| 2007/0255460 A1 | 11/2007 | Lopata |
| 2007/0291437 A1 | 12/2007 | Cornali et al. |
| 2008/0100140 A1 | 5/2008 | Sorenson et al. |
| 2010/0288467 A1* | 11/2010 | Manahan ............... F28F 9/001 165/54 |
| 2013/0066478 A1 | 3/2013 | Smith |
| 2014/0029152 A1 | 1/2014 | Mazzola et al. |
| 2014/0211345 A1 | 7/2014 | Thompson et al. |
| 2014/0362480 A1 | 12/2014 | Veil et al. |
| 2015/0211534 A1* | 7/2015 | Volmer ............... F04D 25/0673 417/45 |
| 2016/0141123 A1 | 5/2016 | Jefferies et al. |
| 2016/0225562 A1 | 8/2016 | Franks et al. |
| 2016/0276116 A1 | 9/2016 | Pignier et al. |
| 2017/0004948 A1 | 1/2017 | Leyh |
| 2017/0265316 A1 | 9/2017 | Grunow et al. |
| 2018/0109107 A1 | 4/2018 | Mosebrook et al. |
| 2018/0138695 A1 | 5/2018 | Wu et al. |
| 2019/0041887 A1 | 2/2019 | Forbes, Jr. et al. |
| 2019/0198267 A1 | 6/2019 | Zhou et al. |

FOREIGN PATENT DOCUMENTS

| | | |
|---|---|---|
| CA | 2162803 A1 | 5/1997 |
| CA | 2100281 C | 8/2004 |
| CA | 2310619 C | 2/2005 |
| CN | 1156977 C | 7/2004 |
| CN | 1614840 A | 5/2005 |
| CN | 201937887 U | 8/2011 |
| CN | 202978872 U | 6/2013 |
| CN | 106532457 A | 3/2017 |
| CN | 103384054 B | 11/2017 |
| CN | 106169708 B | 12/2017 |
| DE | 69818311 T2 | 10/2003 |
| DE | 102012110001 A1 | 4/2014 |
| EP | 0016646 A1 | 10/1980 |
| EP | 0754369 A1 | 1/1997 |
| EP | 1550216 A2 | 7/2005 |
| EP | 1883830 B1 | 11/2012 |
| EP | 2843836 A1 | 3/2015 |
| EP | 2843837 A1 | 3/2015 |
| FR | 2353130 A1 | 12/1977 |
| FR | 2999792 A1 | 6/2014 |
| GB | 1466313 A | 3/1977 |
| GB | 1548287 A | 7/1979 |
| GB | 2244876 A | 12/1991 |
| IN | 217801 B | 4/2008 |
| IN | 201634043598 A | 7/2017 |
| KR | 2010040819 A | 4/2010 |
| KR | 2010044760 A | 4/2010 |
| SU | 597040 A1 | 3/1978 |
| WO | 1992003866 A1 | 3/1992 |
| WO | 2002088852 A2 | 11/2002 |
| WO | 2011071486 A1 | 6/2011 |

* cited by examiner

US 11,239,652 B2

COMPLIANT, HAZARDOUS ENVIRONMENT CIRCUIT PROTECTION DEVICES, SYSTEMS AND METHODS

CROSS REFERENCE TO RELATED APPLICATIONS

This application claims the benefit of U.S. Provisional Application Ser. No. 62/784,965 filed Dec. 26, 2018, the complete disclosure of which is hereby incorporated by reference in its entirety.

BACKGROUND OF THE INVENTION

The field of the invention relates generally to circuit protection devices, and more specifically to compliant electrical circuit protection devices that meet or exceed applicable standards and requirements for operation in hazardous environments.

Various different types of circuit protection devices exist to satisfy the needs of electrical power systems providing electrical power to various electrical loads. For example, various different devices and assemblies are known that provide disconnect functionality between a power supply circuit and an electrical load. With such devices, output power may be selectively switched from a power supply either manually or automatically to facilitate service and maintenance of the electrical power system, as well as to address electrical fault conditions. Circuit breaker devices and fusible disconnect switch devices are two well-known types of devices that each provide a different capability to respond to overcurrent and electrical fault conditions and to electrically isolate load-side electrical equipment from line-side power supply circuitry, thereby protecting the load-side equipment and circuitry from otherwise damaging overcurrent conditions in the electrical power system.

While known circuit protector disconnect devices are available that satisfy the needs of many electrical systems, they remain disadvantaged in some aspects for certain types of electrical systems and applications in which the circuit protectors are located in hazardous locations. Existing circuit protector disconnect devices therefore have yet to completely meet the needs of the marketplace. Improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
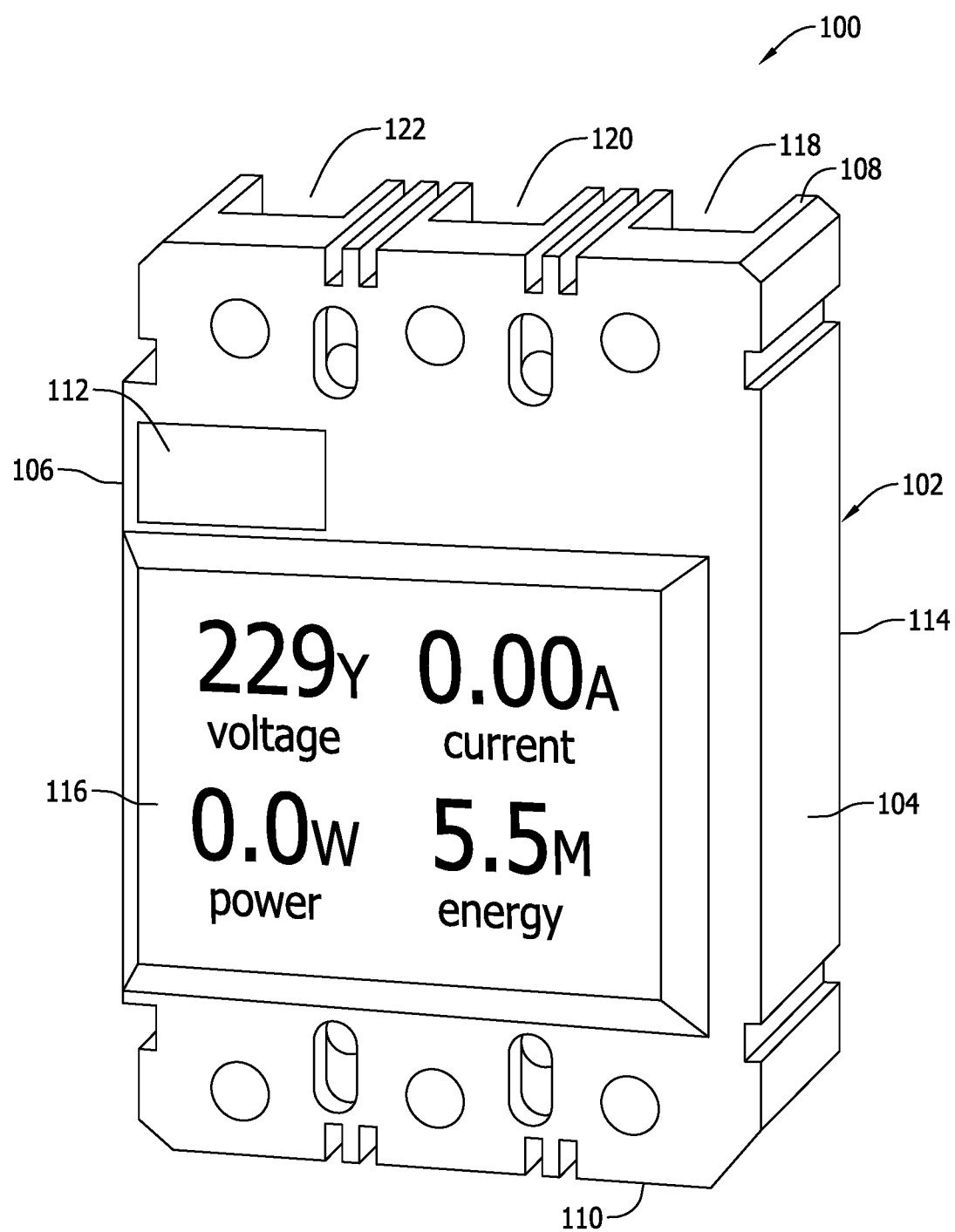
FIG. 1 is a perspective view of a compliant, hazardous location arc-less circuit protection device according to a first exemplary embodiment of the invention.

In order to understand the inventive concepts described herein to their fullest extent, set forth below is a discussion of the state of the art as it relates to issues posed by electrical power systems operating in hazardous locations, followed by exemplary embodiments of circuit protection devices, systems and methods addressing such issues and meeting longstanding but unfulfilled needs in the art.

I. State of the Art

Electrical power systems sometimes operate within hazardous environments presenting a risk of explosion via ignition of a surrounding gas or vapor dusts, fibers, or flyings. Such hazardous environments may arise in, for example only, petroleum refineries, petrochemical plants, grain silos, wastewater and/or treatment facilities, among other industrial facilities in which sustained or volatile conditions in the ambient environment may be present and may present a heightened risk of fire or explosion. An occasional or continuous presence of airborne ignitable gas, ignitable vapors or ignitable dust, or otherwise flammable substances presents substantial concerns regarding safe and reliable operation of such facilities overall, including, but not limited to, safe operation of the electrical power system itself, which in some instances by virtue of conventional circuit protector devices may produce ignition sources in normal operation and in the presence of an electrical fault.

As such, a number of standards have been promulgated relating to electrical product use in hazardous environments to improve safety in hazardous locations in view of an assessed probability of explosion or fire risk.

For example, Underwriter's Laboratories ("UL") standard UL1203 sets forth Explosion-Proof and Dust-Ignition-Proof Electrical Equipment criteria for hazardous locations. Explosion-Proof and Dust-Ignition-Proof enclosures are presently available to enclose or contain electrical products, including but not necessarily limited to circuit protection devices that are not themselves Explosion-Proof or Dust-Ignition-Proof. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of standard UL1203.

The National Electric Code (NEC) Article 500 sets forth a hazardous location coding system, and the NEC generally classifies hazardous locations by class and division. Class I locations are those locations in which flammable vapors and gases may be present. Class II locations are those in which combustible dust may be found. Class III locations are those locations which are hazardous because of the presence of easily ignitable fibers or flyings. Class I, Division 1 covers locations where flammable gases or vapors may exist under normal operating conditions, under frequent repair or maintenance operations, or where breakdown or faulty operation of process equipment might also cause simultaneous failure of electrical equipment. Class I, Division 2 covers locations where flammable gases, vapors or volatile liquids are handled either in a closed system, or confined within suitable enclosures, or where hazardous concentrations are normally prevented by positive mechanical ventilation. Areas adjacent to Division 1 locations, into which gases might occasionally flow, would also be Division 2. Similar divisions are defined in the NEC for the remaining classes.

The International Electrotechnical Commission (IEC) likewise categorizes hazardous locations into Zone 0, 1, or 2 representing locations in which flammable gases or vapors are or may be airborne in an amount sufficient to produce explosive or ignitable mixtures. As defined in the IEC, a Zone 0 location is a location in which ignitable concentrations of flammable gases or vapors are likely to exist under normal operating conditions; or in which ignitable concentrations of flammable gases or vapors may exist frequently because of repair or maintenance operations or because of leakage; or in which equipment is operated or processes are carried on, of such a nature that equipment breakdown or faulty operations could result in the release of ignitable concentrations of flammable gases or vapors and also cause simultaneous failure of electrical equipment in a mode to cause the electrical equipment to become a source of ignition; or that is adjacent to a Zone 1 location from which ignitable concentrations of vapors could be communicated.

While expressed a bit differently, IEC Zone 1 and NEC Division 2, in practice, generally converge to common locations in the assessment of hazardous environments. In view of modern environmental regulation and the concentrated nature of Division 1 and Zone 0 applications, most hazardous equipment, particularly switch gear products of an electrical power system, are installed for use in Division 2 or Zone 1 (or 2) areas. Given that electrical devices, such as those described below, can be ignition sources in certain circumstances, explosion-proof, flame-proof, or ignition proof enclosures are conventionally provided in NEC Division 2 locations and/or IEC Zone 1 locations to house electrical devices that otherwise pose possible ignition risk. The terms "explosion-proof" or "flame-proof" in this context, refer to enclosures that are designed to be capable of containing an internal explosion of a specified flammable vapor-air mixture. In addition, explosion-proof or flame-proof enclosures must operate at a safe temperature with respect to the surrounding atmosphere.

Conventional circuit breaker devices, switch devices of various types, and contactor devices are known to include input terminals connectable to power supply or line-side circuitry, output terminals connectable to one or more electrical loads, and pairs of mechanical switch contacts between the respective input terminals and output terminals. Each pair of mechanical switch contacts typically includes a stationary contact and a movable contact linked to an actuator element that displaces the movable contact along a predetermined path of motion towards and away from the stationary contact to connect and disconnect a circuit path through the device and to therefore electrically connect or disconnect the input and output terminals. When the switch contacts are opened, the device serves to isolate the electrical load(s) connected to the output terminals from the power supply connected to the input terminals. The actuator element in the mechanical switch devices described above may be automatically movable for circuit protection purposes to open the mechanical switch contacts in response to overcurrent or fault conditions in the line-side circuit and electrically isolate the electrical load(s) to prevent them from being damaged, or the actuator element may be manually movable to electrically isolate the electrical loads from the line-side power source for energy conservation, maintenance of the load, etc.

Circuit breakers and fusible disconnect switch devices are two well-known types of devices that each provide a different type of disconnect functionality and circuit protection via mechanical switch contacts. The IEC includes the following pertinent definitions:

2.2.11 circuit-breaker mechanical switching device, capable of making, carrying and breaking currents under normal circuit conditions and also making, carrying for a specified time and breaking currents under specified abnormal circuit conditions such as those of short circuit [441-14-20]

2.2.9 switch (mechanical)

mechanical switching device capable of making, carrying and breaking currents under normal circuit conditions which may include specified operating overload conditions and also carrying for a specified time currents under specified abnormal circuit conditions such as those of short circuit [441-14-10]

NOTE A switch may be capable of making but not breaking short-circuit currents.

2.2.1 switching device device designed to make or break the current in one or more electric circuits [441-14-01]

NOTE A switching device may perform one or both of these operations.

It is seen from the definitions above that the circuit breaker as defined in IEC 2.2.11 and the mechanical switch as defined in IEC 2.2.9 differ in their capability to mechanically respond to abnormal circuit conditions. Specifically, the circuit breaker, as defined in IEC 2.2.11, can mechanically break short circuit conditions, whereas the mechanical switch as defined in IEC 2.2.9 cannot. Because of this, an electrical fuse is sometimes used in combination with the mechanical switch of IEC 2.2.9 to realize a fusible disconnect switch that can respond to a short circuit condition via operation of the fuse (i.e., an opening of the fuse) rather than operation of the mechanical switch contacts.

In either of the devices of IEC 2.2.11 and 2.2.9, the automatic circuit protection may sometimes be provided solely via the structural design and calibration of the circuit breaker structure or the structure of the fuse element(s) in the fuse, provided that each realizes predetermined time-current characteristics before opening of the circuit. The NEC has defined these two basic types of Overcurrent Protective Devices (OCPDs) as follows:

fuse—An overcurrent protective device with a circuit-opening fusible part that is heated and severed by the passage of overcurrent through it.

circuit breaker—A device designed to open and close a circuit by nonautomatic means and to open the circuit automatically on a predetermined overcurrent without damage to itself when properly applied within its rating.

The NEC also requires that circuits be provided with a disconnecting means, defined as a device, or group of devices, or other means by which the conductors of a circuit can be disconnected from their source of supply. Since fuses are designed to open only when subjected to an overcurrent, fuses generally are applied in conjunction with a separate disconnecting means (NEC Article 240 requires this in many situations), typically some form of a disconnect switch. Since circuit breakers are designed to open and close under manual operation, as well as in response to an overcurrent, a separate disconnecting means is not required.

In some types of circuit protection devices, automatic circuit protection may be realized via electrical sensors included in the device to monitor actual circuit conditions and, in response to predetermined circuit conditions as detected by the sensors, electromechanical trip features may be actuated to automatically open the movable contacts in response to detected overcurrent conditions including overload and short circuit conditions. Once tripped, the circuit breaker may be reset or reclosed to restore affected circuitry through the switch contacts, as the circuit breaker is designed to open the circuit without damage to itself, whereas a fuse opens a circuit via internal degradation of the fuse element(s) to the point where they can no longer carry electrical current. As such, the fuse must be replaced after opening to restore affected circuitry. Combinations of circuit breakers and fuses are also desirable in some instances, with selective coordination thereof, to extend the range of overcurrent conditions that may be addressed as well as to improve response times.

In contrast to the circuit protection devices described above, the "switching device" of IEC 2.2.1 as defined above refers merely to the making and breaking of current, without any reference to making or breaking overcurrent conditions (i.e., overload conditions or short circuit conditions). The "switching device" of IEC 2.2.1 therefore provides a disconnect function, but not a circuit protection function. IEC 2.2.1 also does not require a mechanical switching device at all, but to the extent that a switch device that is not a circuit breaker device actually includes mechanical switch contacts, it could nonetheless present an ignition risk when located in hazardous environments.

More specifically, an operation of mechanical switch contacts to make or break an energized circuit, whether manually actuated by a user under normal circuit conditions or automatically actuated under abnormal circuit conditions, presents a possible ignition source in a hazardous environment. Specifically, as the movable contacts are mechanically displaced away from stationary contacts (i.e., moved from a closed position to an opened position) electrical arcing between the switch contacts tends to result. Similar arcing may occur as the movable contacts are moved back towards the stationary contacts to reclose the device. If such arcing between the switch contacts is realized in the presence of a combustible gas, vapor or substance, the arcing may ignite the gas, vapor or substance. While the mechanical switch contacts are typically enclosed in housings provided with conventional circuit breakers or other mechanical switch devices as well as additional enclosures commonly utilized with panelboards or motor control centers, etc., such housings and enclosures are typically not sufficient to isolate electrical arcing from ignitable, airborne elements. For at least this reason, known devices including mechanical switch contacts are sometimes conventionally located in individual explosion-proof enclosures and again contained in an environmental enclosure, or a system of switches (i.e., a panelboard) that can in turn be installed in a single large explosion-proof enclosure without individual explosion-proof enclosures for the switches provided within an NEC Division 1, or 2 or IEC Zone 1 location to provide the necessary protection.

Of the devices described thus far, circuit breakers, while mechanically breaking a short circuit condition, experience the most intense arcing conditions and therefore have the greatest potential in terms of raw energy and temperature to ignite combustible gases, vapors or substances in a hazardous location. Considering that many industrial power systems and loads operate at relatively high voltage and high current, arc energy and arc temperature in lower current overload conditions and normal conditions is likewise considerable and therefore poses ignition risks. In general, ignition energy resulting from the fault energy is related to the magnitude of the current being interrupted, so the higher the current being interrupted the greater the arcing potential and severity. For example, a 65kAIC interruption is much more significant from the arcing perspective, and hence more hazardous, than a 10kAIC interruption.

Available explosion-proof, flame-proof or ignition-proof enclosures are effective to provide safe operation of mechanical switch devices in the NEC Division 1 or 2 location or an IEC Zone 1 location, but generally impart additional costs, occupy valuable space in the electrical power system, and impose certain burdens to the installation and servicing of an electrical power system over time. Obtaining access to the disconnect devices inside the explosion-proof enclosures typically requires a time-consuming removal of a number of fasteners, and after any maintenance procedures are completed all the fasteners must be properly replaced to ensure the desired safety of the explosion-proof enclosure. During maintenance procedures, the area in which the disconnect devices are located are also typically decommissioned (i.e., disconnected) with associated load-side processes shut down to ensure safety during the maintenance procedure. Such decommissions are costly from the perspective of the industrial facility, and limiting or shortening decommissioned downtime is important. It would therefore be desirable in some cases if the explosion-proof enclosures could be eliminated in NEC Division 1 or 2 location or an IEC Zone 1 location while still providing safe disconnect functionality in a hazardous environment. In order to do so, circuit protection devices designed to reduce ignition risks are needed, but at present generally do not exist.

Solid state disconnect devices are known that provide desirable disconnect functionality via semiconductor switches or semiconductor devices such as, but not limited to, insulated-gate bipolar transistors (IGBTs), Metal Oxide Semiconductor Field Effect Transistors (MOSFETs) and other known elements that electronically operate in a known manner to preclude current flow through the device and therefore electrically isolate line-side circuitry from load-side circuitry in response to predetermined circuit conditions without utilizing mechanical switch contacts. Such solid state switches may be implemented in circuit breaker devices or used in combination with fuses to address electrical fault conditions in an automatic manner.

Solid state switches beneficially eliminate electrical arcing associated with displacement of mechanical switch contacts as described above, but nonetheless may still present possible ignition sources via heat generated by the solid state switches in use. Depending on the type and concentration of combustible elements in the hazardous location, the surface temperature of the solid state switch devices may rise to the point where spontaneous ignition may occur due to the flash temperature of the specific gas or ignitable substance in the hazardous location, even though no arcing occurs in the switching operation of the device.

Connecting terminals of solid state switch devices may also present reliability issues and possible ignition sources when used in NEC Division 2 or IEC Zone 1 locations. More specifically, the terminals may tend to loosen over time when subjected to thermal cycling or vibration. Loose terminal connections may cause overheating and possible ignition sources, if not electrical arcing, under certain conditions at the locations of the terminals. Poor quality connections at the terminals may also cause overheating of the conductor structure (sometimes referred to as the bus) in the device, presenting still further ignition concerns in hazardous locations. As such, the use of known solid state switching devices, without more, does not itself ensure sufficient safety in hazardous locations without complementary use of an explosion-proof enclosure in NEC Division 2 or IEC Zone 1 locations.

So-called hybrid disconnect devices are also known that include a combination of semiconductor switches or semiconductor devices and mechanical switch contacts. Such hybrid devices may likewise be implemented in circuit breaker devices or used in combination with fuses to address electrical fault conditions in an automatic manner. Hybrid disconnect devices present a mix of the issues discussed above from the perspective of possible ignition sources in a hazardous location, and adequate safety in the absence of a complementary use of an explosion-proof enclosure in an NEC Division 2 or IEC Zone 1 location cannot be ensured.

II. Inventive Arc-Less Devices, Systems and Methods for Hazardous Location Compliance.

Exemplary embodiments of circuit protection devices are described herein that overcome the problems above and that provide an enhanced degree of safety for compliance with the applicable standards in NEC Division 2 or IEC Zone 1 locations without necessarily requiring a separate explosion-proof, flame-proof or ignition-proof enclosure. As such, and by virtue of an elimination of separately provided flame-proof or ignition-proof enclosures, the exemplary circuit protection devices described herein reduce installations costs for electrical power systems, and save valuable space in electrical panels, control centers, and the like, and provide a more efficient maintenance and oversight of the electrical power system. Method aspects will be in part explicitly discussed and in part apparent from the following description.

In one aspect, exemplary circuit protection devices may be implemented in the form of a solid state switch device having arc-less operation in switching of the device to connect or disconnect load-side circuitry through the solid state switch device, in combination with enhanced features to address possible ignition sources at the connection terminals, and/or including thermal management features to address potential overheating of conductors in the solid state switch device. When implemented in the form of a solid state circuit breaker device, such solid state circuit breakers, unlike conventional circuit breakers, therefore comply with hazardous location standards applicable to NEC Division 2 or IEC Zone 1 locations and thus render conventional explosion-proof, flame-proof or ignition-proof enclosures obsolete for certain applications.

In another aspect, a hybrid circuit protection device may be implemented in the form of a combination solid state switching device and a mechanical switch device, and further in combination with enhanced features to isolate electrical arcing between the mechanical switch contacts from the ambient environment to prevent ignition, as well as addressing possible ignition sources at the connection terminals and/or including thermal management features to avoid potential overheating of conductive elements internal to the hybrid device. Such hybrid circuit protection devices, unlike conventional hybrid circuit protection devices, therefore comply with hazardous location standards applicable to NEC Division 2 or IEC Zone 1 locations and render conventional explosion-proof enclosures obsolete for certain applications.

While the following discussion is made in the context of circuit breaker devices, the inventive concepts below are not necessarily limited to circuit breaker devices and instead may broadly accrue to other types of devices, examples of which are discussed above, and that present similar issues from the perspective of ignition concerns in a hazardous location. Likewise, while the inventive concepts are described in the context of hazardous locations such as NEC Division 2 or IEC Zone 1 locations, the benefits of the concepts described are not necessarily limited to NEC Division 2 or IEC Zone 1 locations and instead may more broadly apply to other types of hazardous environments, and in some aspects may be beneficially provided for use in non-hazardous locations as desired.

FIG. 1 is a perspective view of a compliant, hazardous environment arc-less circuit protection device 100 according to a first exemplary embodiment. The circuit protection device 100 includes a housing 102 having opposing longitudinal sides 104, 106 and opposing lateral sides 108, 110 arranged generally orthogonally with respect to the longitudinal sides 104, 106. The housing 102 also includes a front side 112 and a rear side 114, and the front side 112 may include a digital display 116 that functions as a user interface for the device 100. As shown, the display 116 visually indicates voltage, current, power and energy readings to a person in the vicinity of the device 100 and display 116.

The display 116 may be multi-functional and therefore may display different screens in response to user activation. In some embodiments the display 116 may be touch sensitive with the user making selections by touching selected areas of the display as prompted. Input selectors such as buttons, knobs, etc. may be separately supplied from the display 116 for interaction with a user in relation to the display. An input selector such as a toggle switch may also be provided separately from the display 116 to serve as a manually operable on/off switch that may intuitively be manually operated by a user. The toggle switch may emulate a traditional toggle switch to affect a change of state to "on" or "off", but it does do so without any displacement of mechanical switch contacts because, as explained below, the device 100 does not include mechanical switch contacts.

Alternatively, an on/off feature may be built into the display 116 for convenient use by a user/operator to achieve disconnect switch functionality to connected load-side equipment. It is recognized, however, that the display or an array of displays 116 can be considered optional in certain embodiments and need not be included at all. In further embodiments, additional input/output elements may be provided, whether in the form of a display or other interfaces for user interaction with the device both locally and remotely.

The lateral sides 108, 110 each include connection recesses 118, 120, 122 to enable respective connection to line-side and load-side circuitry. In the exemplary embodiment, three connection recesses 118, 120, 122 are provided for respective connection to a three-phase power supply on one of the sides 108, 110 and to three-phase load-side equipment on the other. The power supply and loads may each operate with alternating current (AC) or direct current (DC). The device 100 as shown is configured as a circuit breaker and therefore provides automatic circuit protection in response to predetermined overcurrent conditions. The predetermined overcurrent conditions may be selected by the user within a certain range and input to the device 100 via the display screen 116, via another user interface including a remote interface, and/or pre-programmed into the device. The device 100 may operate according to specified time-current curves or trip profiles suitable to provide adequate protection for connected loads.

Figure 2:
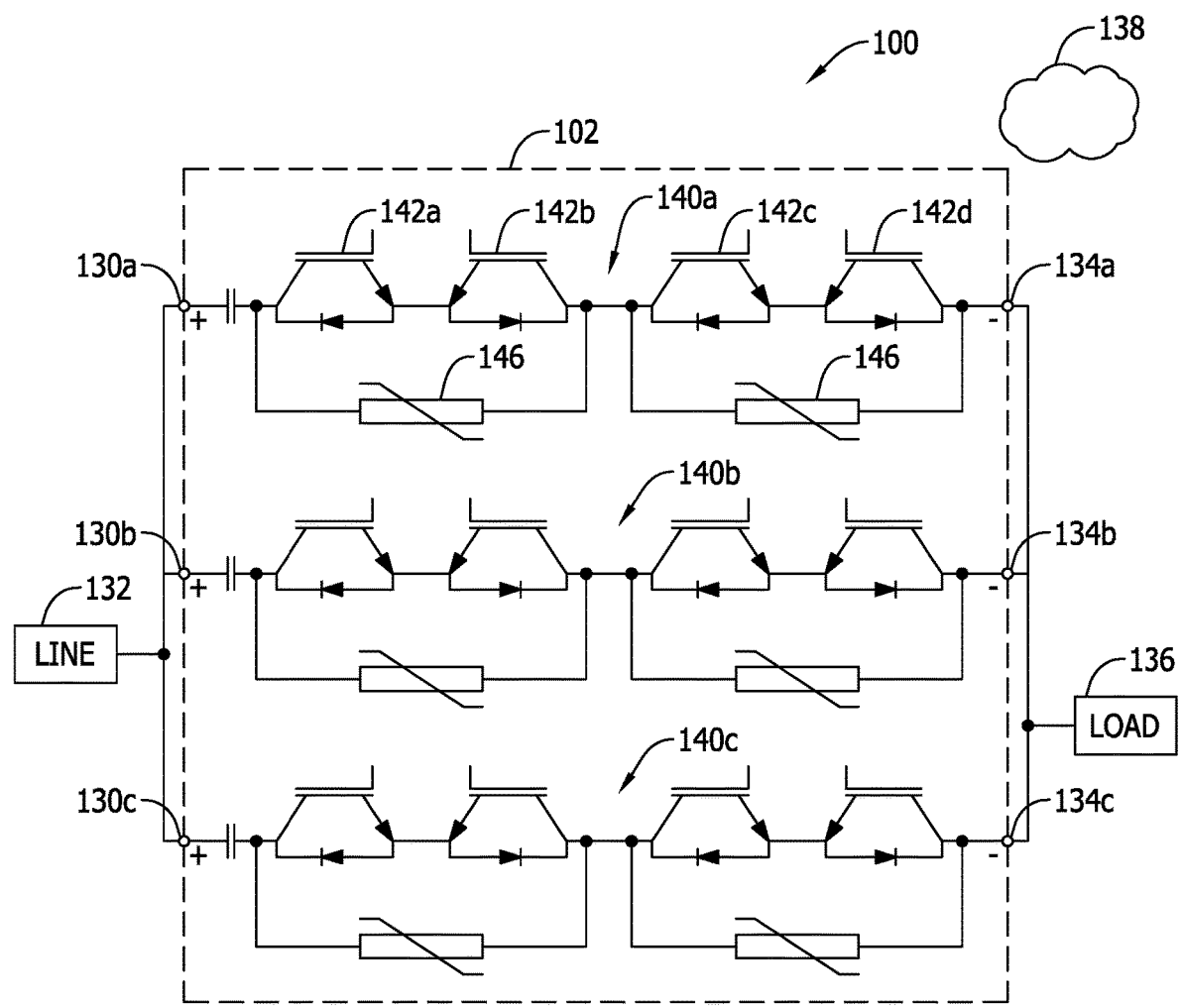
FIG. 2 is a simplified schematic diagram of the circuit protection device shown in FIG. 1 in an exemplary solid state configuration.

FIG. 2 is a simplified schematic diagram of the circuit protection device 100 in an exemplary solid state configuration. The device 100 includes input terminals 130a, 130b, 130c that are each connected to one phase of a three-phase power supply indicated as line-side circuitry 132 in FIG. 2 via connecting cables, conduits, or wires. The device 100 further includes output terminals 134a, 134b, 136c that enable connection to load-side circuitry 136, such as motors, fans, lighting devices, and other electrical equipment in an industrial facility wherein ignitable gas, vapors or substances may be airborne as indicated at 138. Optionally, the device 100 may further include additional elements such as auxiliary contacts and auxiliary connections, shunt trip features, undervoltage release features, communication ports and communication elements, power ports for communication and other purposes, etc.

Between each respective pair of input terminals 130a, 130b, 130c and output terminals 134a, 134b, 136c are solid state switch devices arranged as indicated at 140a, 140b and 140c. The exemplary solid state switch arrangement 140a, 140b, 140c each includes series-connected pairs 142a, 142b, 142c, 142d of insulated-gate bipolar transistors (IGBTs) respectively connected in reverse to one another, with each pair 142a and 142b and 142c and 144d including a varistor element 146 connected in parallel to the IGBTs. The reverse connected IGBTs in each pair precludes reverse current flow through the IGBTs from the load-side circuitry 136 to the line-side circuitry 132 in a known manner.

The IGBTs 142a, 142b, 142c, 142d in each arrangement 140a, 140b, 140c are one form of a semiconductor switch that is operable to either permit current flow between the respective input and output terminals 130a and 134a, 130b and 134b, and 130c and 134c from the line-side circuitry 132 to the load-side circuitry 136 or preclude current from flowing through the device 100 such that the load-side circuitry 136 becomes electrically isolated from the line-side circuitry 132. Briefly, a positive voltage applied from the emitter to the gate terminal of each of the IGBTs causes electrons to be drawn toward the gate terminal across a body region thereof. If the gate-emitter voltage is at or above a threshold voltage, enough electrons are drawn towards the gate to form a conductive channel across the body region, thus allowing current to flow from the collector to the emitter. If the gate-emitter voltage is below the threshold voltage essentially no current can flow across the body region, such that by controlling the gate-emitter voltage, current flow between the input and output terminals may be selectively enabled or disabled to connect or disconnect the output terminals from the input terminals of the device 100 via the IGBTs. Equivalent types of semiconductor switch elements other than IGBT elements may likewise be employed, including, but not limited to, equivalent types of semiconductor switch elements such as Metal Oxide Semiconductor Field Effect Transistor (MOSFET) elements, bipolar transistor elements, silicon controlled rectifier elements (sometimes referred to as thyristors), and the like. The number of semiconductor switch elements may be varied to be greater or less than the number shown in FIG. 2.

The varistor elements 146, connected in parallel to each pair of IGBTs in the arrangement shown, exhibit a relatively high resistance when exposed to a normal operating voltage, and a much lower resistance when exposed to a larger voltage, such as is associated with over-voltage conditions. The impedance of the current path through the varistors 146 is substantially lower than the impedance of the IGBTs when the varistors operate in a low-impedance mode, and is otherwise substantially higher than the impedance of the IGBTs. This means that in normal conditions, the high impedance of the varistors causes all of the current to flow through the IGBTs. However, as over-voltage conditions arise, the varistors switch from the high impedance mode to the low impedance mode and shunt or divert over-voltage-induced current surges away from the IGBTs to the load-side circuitry 136. As over-voltage conditions subside, the varistors may return to a high impedance mode. The varistors beneficially enable, for example, motor inrush currents to flow through the device 100 while otherwise permitting the IGBTs to respond to overcurrent conditions after motor starting is complete. In other applications, however, the varistors 146 may be considered optional and may be omitted.

While exemplary solid state switching arrangements are shown and described, others are possible to achieve solid state switching functionality in an arc-less manner. As discussed above, the solid state switching devices avoid the type of arcing that mechanical switches produce, and therefore avoid such arcing from being a possible ignition source.

Figure 3:
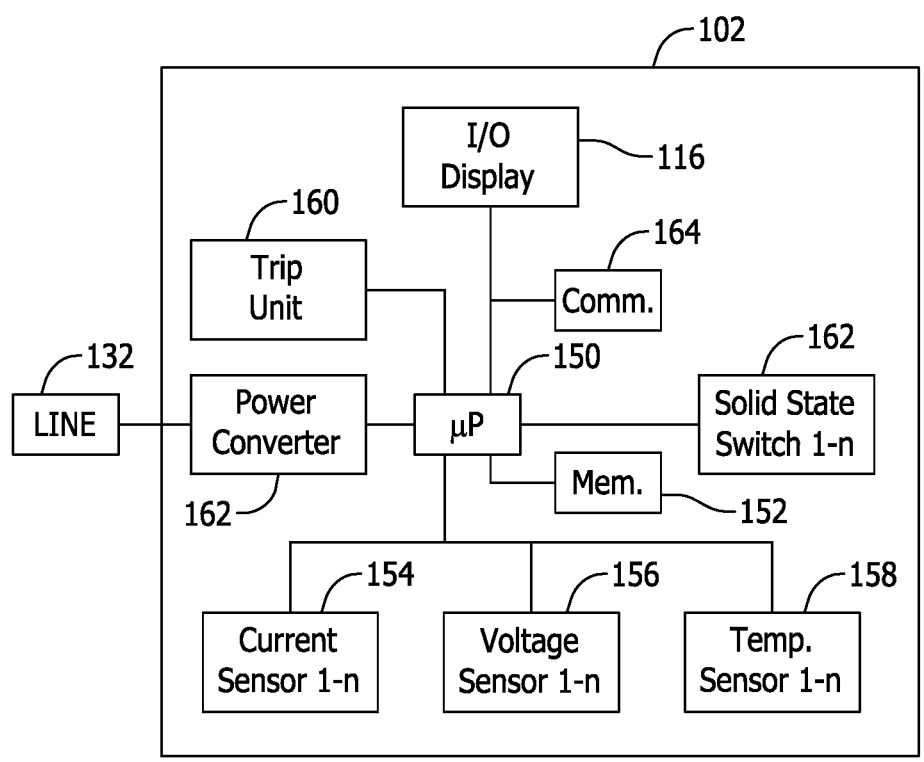
FIG. 3 is a block diagram of the circuit protection device shown in FIGS. 1 and 2.

FIG. 3 is a block diagram of the circuit protection device 100. The device 100 includes a processor-based microcontroller including a processor 150 and a memory storage 152 wherein executable instructions, commands, and control algorithms, as well as other data and information required to satisfactorily operate the device 100 are stored. The memory 152 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

The devices 100 also include sensors 154, 156, 158 provided in a number 1 through n that equals the number of switching poles in the device 100. As such, for the three pole device 100 shown in FIGS. 1 and 2, three sensors of each type may be included that respectively detect current, voltage and temperature at respective locations in the device to assess actual operating circuit conditions in the device. Additional temperature sensors may optionally be provided per switching pole in further embodiments for enhanced temperature monitoring at a plurality of locations in each pole. The sensors 154, 156 and/or 158, in turn, provide inputs to the processor 150. Thus, the processor 150, by virtue of the sensors 154, 156 and/or 158, is provided with real-time information regarding current passing through each of the solid state devices 162 in number 1 through n that equal the number of switching poles in the device 100.

The detected current is monitored and compared to a baseline current condition, such as a time-current curve or trip profile that is programmed and stored in the memory 152 or the trip unit 160. By comparing the detected current with the baseline current condition, decisions can be made by the processor 150 to control the solid state switching devices 162, by controlling an output voltage to the gate-emitter voltage in the IGBT's described above, to cease conducting current to protect the load-side circuitry from damaging currents. In some embodiments, the trip unit 160 enables the user to select settings for the operation of the trip unit 160 and alter the time-current response of the device 100 within predetermined limits. In one example, a user may select a current rating of the device 100 at a value from 50 A to 100 A, with the trip unit 160 applying the appropriate time-current curve or time-current profile for the selected current rating.

The detected voltage may likewise be monitored and used as a basis in making control decisions, such as whether to operate the solid state switching elements 162 to protect the load-side circuitry and components from adverse operating conditions. Since voltage and current are related, detected voltage can be compared to detected current to facilitate an assessment of the health of the device 100, identify errors, and facilitate diagnosis and troubleshooting of the electrical power system. As other failsafe measures, voltage and current can be calculated from sensed parameters and compared to the sensor feedback to detect error conditions.

The detected temperature may likewise be monitored and used to make control decisions whether to operate the solid state switching elements 162 to protect the load-side circuitry and components from adverse operating conditions. Additionally, the detected temperature may ensure that conductors in the device 100 are operating below rated temperatures for the particular hazardous location in which it resides. For example, if the rated temperature is 200° F., the processor 150 can operate the solid state switches 162 to disconnect and cease current flow when the operating temperature as indicated by the temperature sensors has risen to near 200° F. that could ignite airborne gases, vapors or substances in the hazardous locations.

The processor 150 is in communication with the input/output display 116 to provide feedback to a user and to accept inputs made via the display 116.

In the example shown, the processor 150 receives line-side power through power converter circuitry 162. The power converter circuitry 162 includes step down components and analog to digital conversion components when necessary to supply direct current (DC) power to the processor 150 at reduced voltage in a known manner. Conversion of the line power to appropriate levels to power the electronics avoids any need for an independent power supply, such as batteries and the like or a separately provided power line for the electronic circuitry and controls that would otherwise be necessary, although in some embodiments such an independent power supply may indeed be included if needed or as desired. The controls described may be implemented on a circuit board in various arrangements of electronic packages, with algorithmic control features programmed and stored in the device memory.

A communication element 164 is also included that may communicate data to a remote location to assess operation of the larger electrical power system. Wireless and non-wireless communication of data of interest, including but not limited to current data, voltage data (including waveform data), temperature data, on-off status data of the solid state switching elements, selected setting data, trip time data, etc. is possible, and such data may be stored and archived locally and remotely for analysis of the electrical power system over time. Remote actuation of the device 100 is also possible via the communication element 164.

While an exemplary architecture of the device 100 has been described, it is understood that certain elements shown in FIG. 3 may be considered optional to provide more basic functionality. Moreover, additional elements could be added to realize still further sophistication and intelligence in the operation of the device 100, as well as to provide additional functionality beyond circuit protection and disconnection functionality.

FIGS. 4 through 8 illustrate secure terminal assemblies for the device 100 that establish electrical connection to the line-side and load-side circuits and equipment, any of which can be used as the line-side terminals 130*a*, 130*b* or 130*c* or the load-side terminals 134*a*, 134*b*, 134*c*, as shown in FIG. 2. The secure terminal assemblies facilitate reducing, if not eliminating, problems associated with conventional terminals that tend to loosen over time when subjected to thermal cycling, vibration, or other demanding operating conditions in hazardous environments. Loose terminal connections can increase resistance at the terminals and generate excessive heat in operation of the device. In some instances such increased resistance or heat can degrade the connection to the point of failure and electrical arcing at the terminals may result. Improved terminal assemblies that more safely secure and maintain the cable connections to the device 100 are therefore needed to reduce, if not eliminate, possible ignition sources attributable to deterioration of the cable connections in use. Moreover, the improved terminal assemblies may likewise be utilized to establish secure electrical connections to cables to establish auxiliary connections, input/output connections etc. as needed or as desired.

Figure 4:
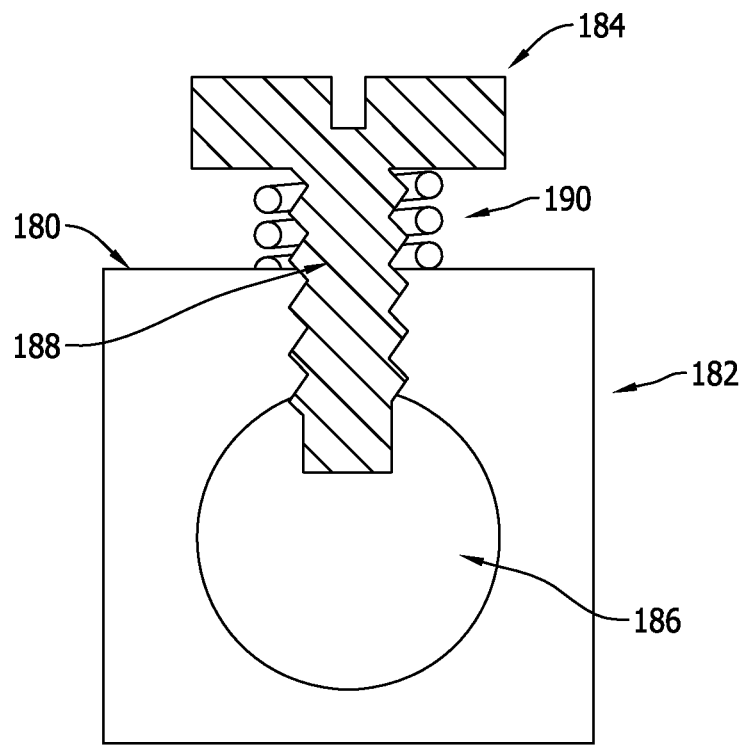
FIG. 4 is a sectional view of a first exemplary terminal assembly for the circuit protection device shown in FIGS. 1 through 3.

As shown in FIG. 4, a secure terminal assembly 180 includes a box lug 182 and a terminal fastener 184 such as a screw. The box lug 182 defines an opening or aperture 186 that accepts a leading end of a cable conductor along a first axis that extends into the plane of the page in FIG. 4 in the example shown. The box lug 182 also defines a threaded aperture 188 formed on the upper side of the box lug 182 to receive the fastener 184 along a second axis extending perpendicular to the first axis in the vertical plane of FIG. 4 as drawn.

In use, a cable conductor used to establish a line-side or load-side connection is received in the aperture 186 of the box lug 182 along the first axis, and the head of the fastener 184 may then be turned to advance the opposite end of the fastener 194 into the aperture 186 toward the cable conductor. Once the end of the fastener makes physical contact with the cable conductor in the box lug aperture 186, further advancement of the screw fastener 184 generates a clamping force holding the cable conductor firmly in place in surface contact with the box lug 182 to complete the electrical connection.

In order to prevent the fastener 184 from loosening in subsequent operation of the device, a coil spring 190 is extended around the shank of the screw fastener between the upper surface of the box lug 182 and the screw head. When the screw is tightened in contact with the cable conductor to establish the desired contact clamping force, the spring 190 essentially locks or jams the screw and box lug together. Such locking of the fastener 184 in the desired position realizes a vibration-proof connection that prevents a loose connection between the cable connecter and the terminal from developing over time. Additionally, the locking of the fastener 184 in the desired position avoids any tendency of the screw to loosen over time when subject to thermal cycling. By ensuring quality terminal connections, the locking terminal assembly of FIG. 4 avoids excessive heat and/or electrical arcing at the terminals, and ensures that operating temperatures of the conductor bus structure and the terminals can remain within appropriate temperature limits designed into the device for use in a hazardous location.

Figure 5:
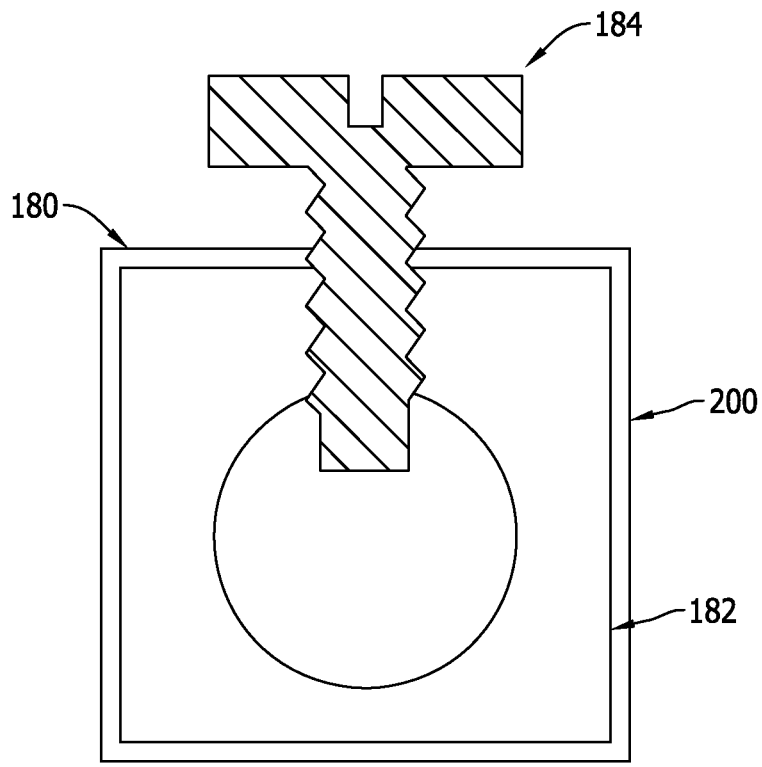
FIG. 5 is a sectional view of a second exemplary terminal assembly for the circuit protection device shown in FIGS. 1 through 3.

In the secure terminal assembly illustrated in FIG. 5, an alternative locking element in the form of a spring plate 200 is provided that surrounds the box lug 182 as shown. When the fastener 184 clamps the cable conductor with the desired amount of contact clamping force, the spring plate 200 likewise effectively locks and jams the screw and box lug together, thereby realizing a similar effect to the coil spring 190 shown in FIG. 4. While the arrangement in FIG. 5 omits the locking spring 190 in favor of the spring plate 200, the spring 190 and the spring plate 200 could be used in combination to lock and jam the screw to prevent it from loosening.

Figure 6:
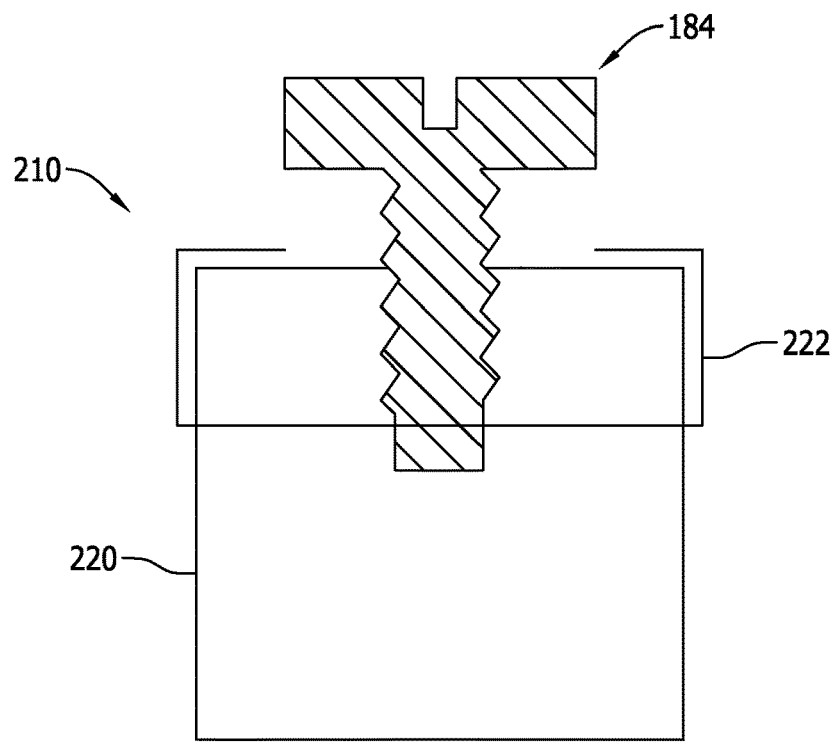
FIG. 6 is a sectional view of a third exemplary terminal assembly for the circuit protection device shown in FIGS. 1 through 3.

FIG. 6 illustrates a secure terminal assembly including a locking terminal arrangement with another form of lug terminal 220 and spring plate 222 extending only on the upper portion of the terminal 220. The spring plate 222 likewise effectively locks and jams the screw and lug terminal together with the screw clamping the cable conductor with desired contact force, thereby realizing a similar effect to that described above. The spring plate 222 in FIG. 6 achieves the locking effect at a location interior to the terminal lug 220, while the examples of FIGS. 4 and 5 achieve the locking effect at a location exterior to the terminal lug. Of course, interior and exterior locking elements are possible in combination such as by including the spring 190 of FIG. 4 and the spring plate 202 of FIG. 6.

While exemplary geometries and locations of locking elements in the form of spring and spring plates are shown in FIGS. 4 through 6, other types and geometries of locking elements are possible to achieve the beneficial locking or jamming desired at the same or different locations to prevent undesirable loosening of the terminal connections in subsequent operation of the device. It is understood that the locking effect described is sufficient to overcome any tendency of the connections to loosen via exposure to vibration, thermal cycling, and other environment demands of the hazardous location, but nonetheless can be overcome without undue difficulty when needed to facilitate new connections, or to remove the device 100 from the line-side and the load-side circuitry altogether when necessary. Likewise, auxiliary circuit connections or other terminal connections made to similar terminals can be overcome without undue difficulty when needed to facilitate new connections, or to remove the device 100 for service or replacement.

Figure 7:
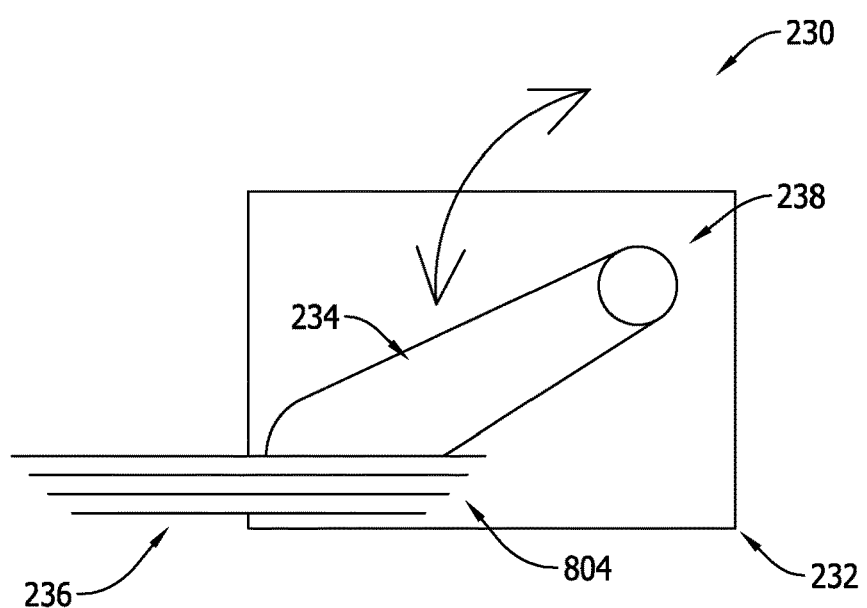
FIG. 7 is a sectional view of a fourth exemplary terminal assembly for the circuit protection device shown in FIGS. 1 through 3.

Another secure terminal assembly 230 is illustrated in FIG. 7 including a terminal lug 232 and a rotatable lever 234 mounted to the terminal lug 232, such that the lever 234 can be rotated toward the cable conductor that is received in the terminal lug 232. A biasing element 238 such as a torsion spring is provided at one end of the lever 234 about the lever's axis of rotation to apply a desired contact force to the cable conductor and hold it in position in the terminal lug 232, ensuring that the wire 236 is tightly secured and will not loosen due to vibration or thermal cycling. The biasing element 238 retains and effectively locks the cable conductor in place under force, realizing an essential vibration-proof connection that is not adversely affected by thermal cycling over time.

The terminal assembly 230 avoids the conventional fastener screw of previous assemblies and therefore provides additional benefits. The biasing element 238 realizes a consistent contact clamping force that is not dependent on the installer, whereas the fastener assemblies of FIGS. 4-6 may be tightened to varying degrees by different persons and thus some variability in the quality of connections made may result. The terminal assembly 230, including the lever 234, may also be quickly and conveniently locked by hand, without use of tool, whereas the fastener assemblies of FIGS. 4-6 require the use of tool such as a screwdriver to achieve the desired locking. Release of the cable conductor is also simplified for the terminal assembly 230 as the user need not overcome the locking or jamming effect of the spring 190 or spring plates 200, 202 to loosen the fastener 284, but instead may simply rotate the lever 234 with sufficient force to overcome the clamping force of the torsion biasing element 238 and then pull the cable conductor 236 from the terminal.

Figure 8:
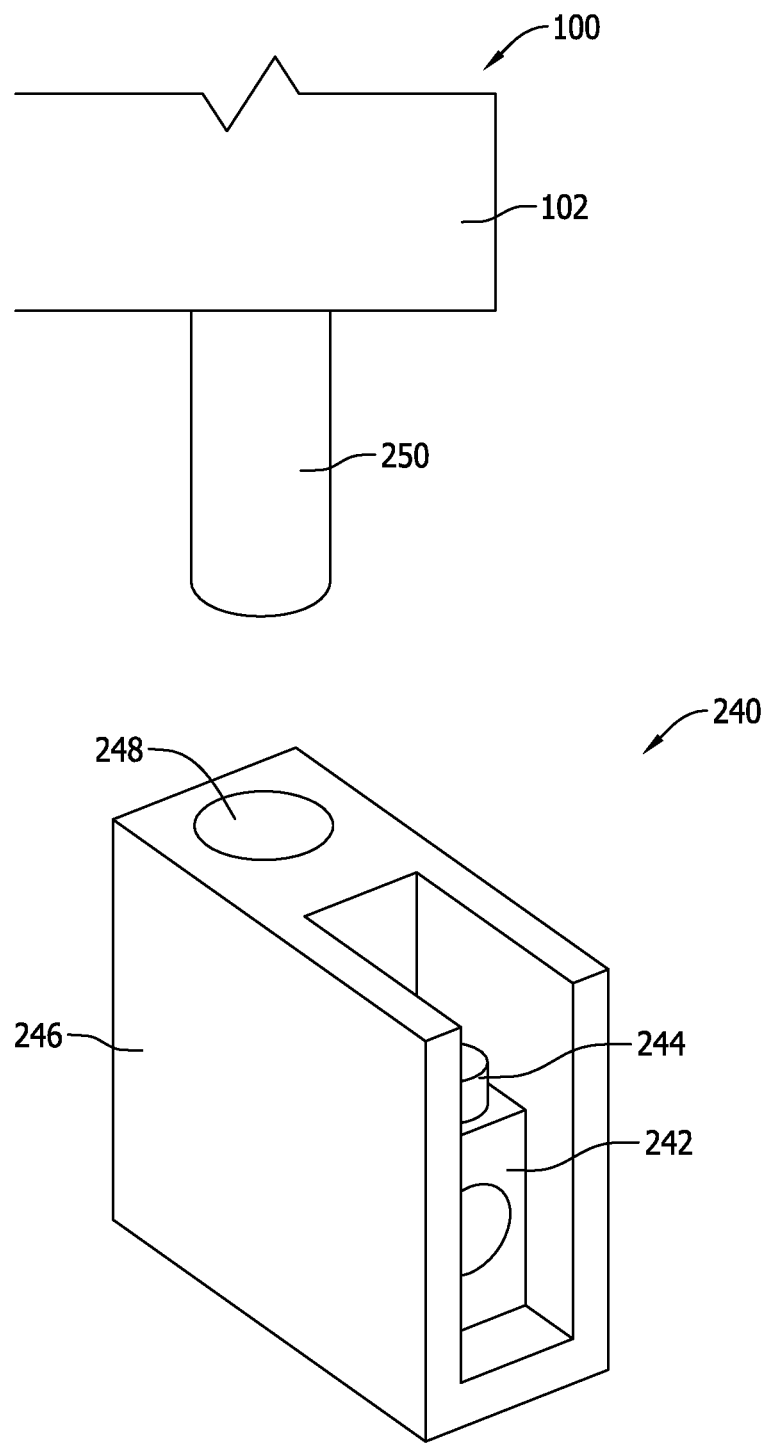
FIG. 8 is a perspective view of a fifth exemplary terminal assembly for the circuit protection device shown in FIGS. 1 through 3.

FIG. 8 illustrates still another embodiment of a secure terminal assembly 240 including a terminal lug 242 and fastener 244 that may securely connect to a cable conductor via, for example, the arrangements described above. The terminal lug 242, however, is nestled within a larger terminal housing 246 including a connection aperture 248. A connector pin 250 may be received in the aperture to complete an electrical connection to the terminal lug 242 in the housing 246.

Notably, and unlike the previously described secure terminals of FIGS. 4 through 7 that are mounted to the housing 102 of the device 100, the pin 250 is mounted to or projects from the housing 102 of the device 100 for plug-in insertion and removal to the terminal assembly 240 via the aperture 248. As such, once the cable conductor connections are made to the terminal lug 242, the device 100 can be removed, re-installed, or replaced without disturbing the cable conductor connections. Locking or latching elements may be included to secure the pin 250 and/or the device housing 102 in fixed relation to the aperture 248 and/or the terminal housing 246. Likewise the lug 242 may be arranged in any suitable structure so to secure the cabling for use in a hazardous location.

Since the device 100 includes solid state switches, the pin 250 of the device 100 can be removed from the aperture 248 after the switches are controlled to ensure that no current is flowing through the device, precluding any possibility of electrical arcing and facilitating desirable "hot swap" functionality wherein the device 100 may be removed while the line-side circuit remains "live" or energized. Alternatively, the solid state switches can be controlled in response to sensed parameters to limit current as the pin 250 is being removed to reduce arcing to levels that are insufficient to present ignition concerns for the hazardous location. The solid state switching elements in the device 100 are likewise operable to limit current flow when the pin 250 of the device 100 inserted into the aperture 248 to complete the electrical connection to the terminal lug 242 and the connected cable conductor. The device 100, by virtue of the pin 250 and aperture 248 that realize a plug and socket connection, is beneficial in that the electrical connection is made or broken inside the aperture 248, safely protecting a user from electrical shock when installing and removing the device 100 by hand. Particularly for panelboard installations including a number of devices 100 on the panel, the ease of hot swap installation and removal by hand without disturbing the cable conductor connections affords substantial benefits in time and labor costs to service the electrical power system.

While in the example illustrated the device 100 includes the pin 250 and the terminal assembly 240 includes the aperture 248, this could effectively be reversed in another embodiment. That is, the device 100 could include an aperture while the terminal assembly includes a pin that would in combination realize at least some of the benefits described above. In the case of the terminal assembly including the pin, appropriate measures should be undertaken to prevent a risk of electric shock due to exposed and energized portions of the terminal pins. For example, an insulating shroud or shield may be included in the terminal assembly that surrounds the pin to prevent user contact with the pin when the device 100 is removed, yet does not impede the electrical connection with the device 100. Another exemplary safety measure may include a mechanical interlock and an additional switch being manually or remotely operable to disconnect the terminal including the pin before the device 100 can be removed. Finally, the line-side can be de-energized via operation of an upstream switch or circuit protector to allow the device to be safely removed and replaced without risk of electric shock to the user.

While exemplary types of male and female connector elements have now been described, alternative types and shapes of male and female connector elements may be provided in combination in other embodiments.

The terminal assembly 240 presents further benefits in that it can be configured to realize an accept/reject feature for the device 100 to ensure that only a compatible device 100 of the proper rating can be installed. For example, different devices 100 having different ampacity ratings may be provided with different diameters of pins 250, and different versions of the terminal assembly 240 can be provided with different diameters of apertures 248. As such, and for example, a device 100 having an ampacity rating of 200 A can be rejected via incompatibility of the pin 250 with the aperture 248 of the terminal assembly 240 that is rated for 100 A and connected to 100 A cable conductors, while a device 100 having an ampacity rating of 100 A and corresponding pin 250 can be received in the aperture 248 of the terminal assembly 240 that is rated for 100 A and connected to 100 A cable conductors. If the higher amperage device 100 were to be inadvertently installed, it would not respond to overcurrents that could cause the 100 A cable conductors to overheat and possibly fail, not to mention defeating the desired circuit protection to the load-side circuitry, but by virtue of the accept/reject feature human error in installing an incorrectly rated device 100 is eliminated. Particular benefits may accrue here in a panelboard application including a number of differently rated devices 100 that could otherwise be confused.

While one type of accept/reject feature is described and illustrated including cylindrical pins and apertures, numerous variations are possible in this regard. Different geometries and shapes of pins and apertures, as well as different dimension may be provided to distinguish various different ratings of devices 100 with distinct accept/reject features. For example, a first set of devices 100 could be provided with square pins, a second set of devices 100 could be provided with circular pins, and a third set of devices 100 could be provided with octagonal pins, etc. The terminal assemblies 240 could likewise be provided with square, circular, and octagonal apertures. The dimensions of the square, circular, and octagonal apertures and pins could likewise be varied to provide unique accept/reject features and visual cues to an installer to select and install the correct device 100 in any given installation to ensure that the device is compatible with existing wiring that is coordinated with the terminal assemblies 240 of each type.

In another aspect, the terminal assemblies 240 may beneficially be used as accept/reject features to ensure that a given device 100 is connected to the line-side and load-side circuitry with proper polarity. That is, the shapes and/or dimensions of pins and apertures defining the male and female connectors may be varied on the line-side and load-side of the device 100 to ensure that the device can only be installed in the proper orientation with proper polarity and cannot be installed in a reverse orientation wherein the load-side terminal of the device 100 is inadvertently connected to the line-side circuitry. In such an orientation, the device is essentially mistake-proof in that improper installation is prevented. As such, and for example, a line-side pin 250 of the device 100 may have a larger diameter than a load-side pin 250 of the device 100, such that the line-side pin can only be received in the line-side aperture 248 of the line-side terminal assembly 240 having a larger diameter aperture 248. An improper attempt to insert the line-side pin 250 in the line-side terminal assembly 240 having a smaller diameter aperture therefore cannot succeed.

As another example, the line-side pin 250 of the device 100 may be a square pin while the load-side pin 250 of the device may be a cylindrical pin that perhaps provides a more intuitive visual cue to the proper installation of the device 100 that is polarity dependent, with the terminal assemblies 240 including square and cylindrical apertures 248, respectively, that are dimensioned to block any attempt to install the device 100 with reversed polarity. As another example, the line-side of the device 100 may be provided with a male pin connector while the load-side device may be provided with the female aperture connector, again providing a visual cue to an installer that may avoid any attempt to incorrectly install the device with reverse polarity. Further, the pin or aperture/receiver may include multiple segments so to improve contact engagement, lower resistance, and ensure further integrity of the electrical connection against degradation.

In further embodiments, color coding and labeling features and the like may also be utilized on portions of the device housing 102 and the terminal housing 246 to visually cue an installer how the user to properly install the device 100 and therefore assist with proper installation of devices 100 in a panelboard or other installation wherein differently rated devices 100 are present. For example, the colors black and red may indicate the line-side and load-side of the device 100, and the colors black and red may indicated the line-side and load-side ones of the terminal assemblies so that the installer can follow the colors to install devices 100 properly. The positive and negative symbols + and − may also be used to identify the line-side and load-side connections for the devices 100 and terminal assemblies 240. Color coding, labels, and symbols may be combined with the shapes and pins and apertures for the terminal assembly 240 to facilitate reducing a likelihood that an installer would even attempt to install an incompatible device 100 or to reverse the intended polarity of the device 100. Especially in hot swap applications that can be removed and replaced quickly with an increased chance of human error, providing appropriate accept/reject features to ensure the compatibility and polarity of the proper device for installation is significant to safe operation of a large number of devices in a hazardous location. Human error is avoided, while convenience and ease of installation and completing maintenance procedures for the electrical power system is considerably improved.

Figure 9:
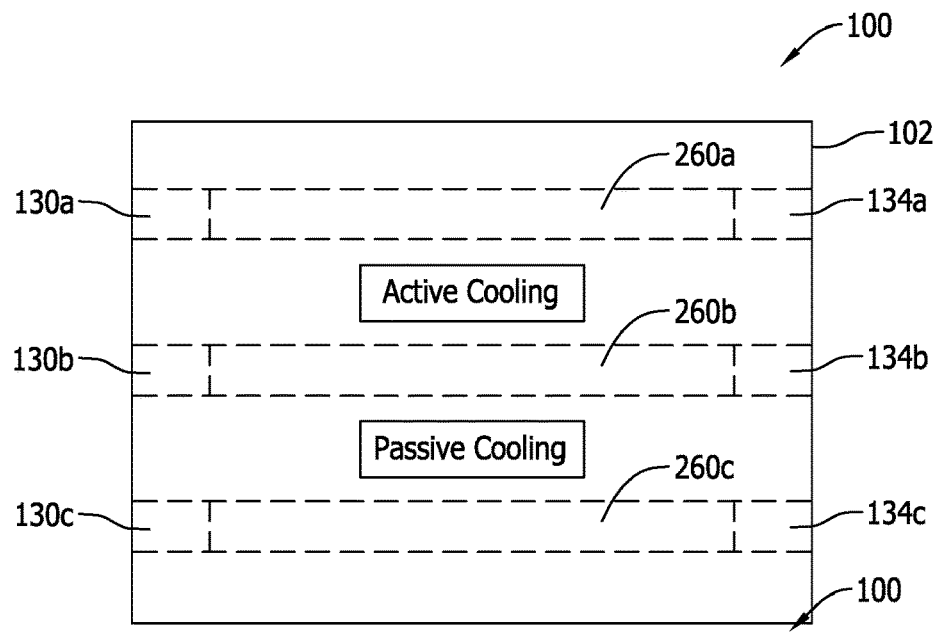
FIG. 9 diagrammatically illustrates exemplary thermal management features for the circuit protection device shown in FIGS. 1 through 3.

FIG. 9 diagrammatically illustrates thermal management features for the circuit protection device 100. Thermal management is important to effectively distribute heat generated by the device 100 in use, and to keep surface temperatures of the device 100 below the applicable temperature limits for the hazardous location to avoid any possibility of ignition. Managing the surface temperature is a multi-faceted exercise balancing the following considerations The dimensions and outer surface area of the housing 102 may be varied to achieve a surface temperature target, without exceeding it, under expected operating conditions, including normal and overcurrent conditions of the electrical power system. A larger housing 102 having a larger surface area will in general dissipate heat over a larger surface area and therefore run cooler than an otherwise similar device with a smaller surface area. It is noted here that a larger surface area can be obtained without significant increase in package size by including heat dissipating fins and contoured surfaces of the housing.

The size and spacing of the conductors 260a, 260b and 260c in the housing 102 of the device 100 that defines the bus structure interconnecting the line-side terminals 130a, 130b, 130c, the solid state switch arrangements 140a, 140b, 140c and the load-side terminals 134a, 134b and 134c and (FIG. 2) is another consideration from a thermal management perspective. For any given current flowing through the device, larger conductors 260a, 260b and 260c will generate less heat than smaller ones.

Increasing the path length of the conductors 260a, 260b and 260c will result in reduced heating of the conductors relative to conductors of shorter path length. Therefore, a tortuous path conductor 260a, 260b and 260c will produce less heat than a generally straight conductor 260a, 260b and 260c as illustrated in FIG. 9.

The relative spacing between the conductors 260a, 260b and 260c affects the heat that is generated by the device in use. As spacing between the conductors is increased, thermal coupling of the conductors 260a, 260b and 260c will be reduced.

The material used to fabricate the housing may be varied to achieve thermal management and operating surface temperature goals, as some materials exhibit better thermal performance to distribute and dissipate heat than other materials. For example, specific polymeric resins may be selected or customized, and also processed to formulate a material that will improve thermal performance of the housing 102 both internally and on its outer surface area. Metal and plastic housing elements may be used separately or in combination to fabricate the housing 102. In some instances, the housing 102 may be partly or entirely filled with dielectric material, dielectric filler or other filler media that can contain, absorb, or distribute heat in the interior of the housing and therefore lower the surface temperature of the device 100 in use.

The housing structure could likewise include specific features designed with heat distribution and dissipation in mind. More than one material could be provided or assembled to achieve additional thermal insulation in desired areas, such as in between adjacent conductors 260a, 260b and 260c and avoid thermal coupling. Wall thickness of the housing could be varied to provide greater or lesser degrees of heat dissipation in selected portions or areas at the most desirable location. Piping, channels, or pockets may be formed to strategically capture generated heat and direct it more efficiently to desired locations for dissipation. Heat sink materials and the like may be included to improve thermal absorption and dissipation.

Finally, active cooling elements may be provided to circulate an inert gas or cooling fluid through portions of the device 100 to improve thermal performance of the device 100. Such active cooling elements may be self-contained or externally provided, and may act individually and independently in each device 100 or act collectively on or across multiple devices 100. As one example, in a panelboard application, cooling fans or pumps may circulate fluids in or around a number of devices 100 to effectively manage surface temperatures. The devices 100 including temperature sensors 158 (FIG. 3) may provide feedback signals to an active cooling system to power on when needed and otherwise be powered off. Thermal electrics may also be deployed as feedback loops with the load equipment to reduce available current through the device (thereby reducing heat). Thermal electrics could be used as an alternative to the fan/pump cooling methods previously described.

As a further thermal management feature, the solid state switch devices 140a, 140b and 140c may be encapsulated with a strategically selected or otherwise formulated material to improve thermal performance of the switch devices 140a, 140b and 140c and/or improve heat dissipation and distribution in use. The encapsulation material of the solid state switch devices 140a, 140b and 140c may be the same or different from encapsulation materials included in the housing construction, and specifically are targeted to control or limit the operating temperature of the silicon in the solid state switch devices in normal circuit operation or in overcurrent conditions and electrical fault conditions to prevent overheating of the switch devices themselves or overheating of the housing 102.

The above described thermal management considerations may be pursued in various different combinations, some of which may obviate a need for other considerations. For example, active cooling elements could obviate any need for passive heat sinks in a given device 100. As another example, if the geometry and form factor of the housing 102 was optimized and fabricated from a high performance polymer, it could obviate a need for active cooling elements. The temperature sensing may also be used to implement a failsafe shutdown of the device 100 as temperatures approach or exceed selected thresholds. That is, the semiconductor switches could be controlled to disconnect the load-side and interrupt current flow to arrest any further escalation in the surface temperature, possibly independently of whether or not an overcurrent condition or fault condition is present that would otherwise cause the device to trip.

Figure 10:
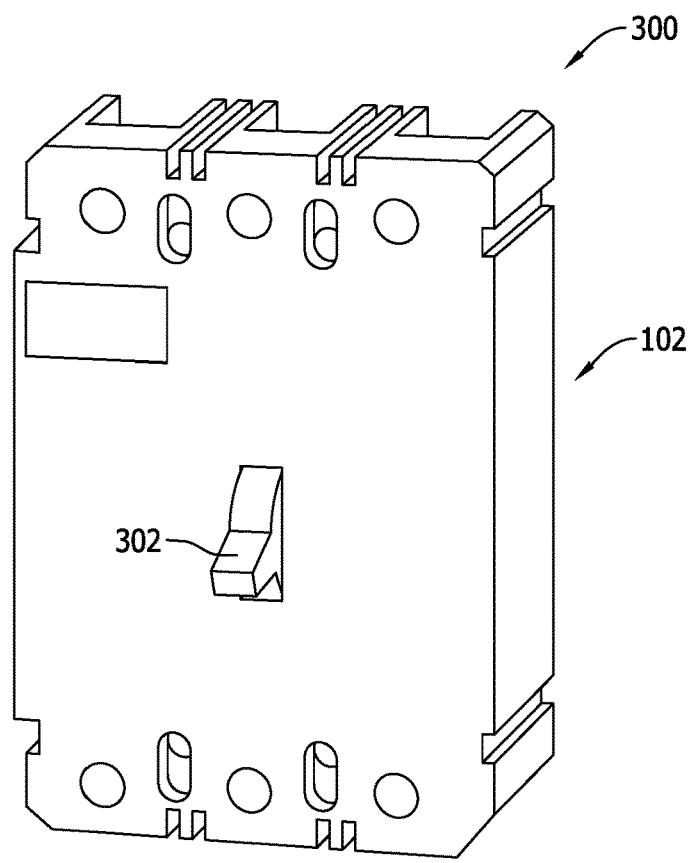
FIG. 10 is a perspective view of a compliant, hazardous location arc-less circuit protection device according to a second exemplary embodiment of the invention.

FIG. 10 is a perspective view of a compliant, hazardous environment arc-less circuit protection device 300 according to a second exemplary embodiment of the invention. The circuit protection device 300 includes the housing 102 described above in relation to the device 100, but omits the digital display 116 of the device 100 (FIG. 1). As shown in FIG. 10, a toggle switch 302 is accessible to a user on the upper face of the housing 102 for manual activation of the device 300 between "on" and "off" states to connect and disconnect the load-side of the device 300 from the line-side. Manual actuators other than toggle switches may be employed in other embodiments. In some cases, the display 116 could be provided in addition to or in lieu of the toggle switch 302 or another manual actuator.

Like the device 100, the device 300 may interconnect line-side or power supply circuitry and electrical loads operating via alternating current (AC) or direct current (DC). The device 300 as shown is configured as a circuit breaker and therefore provides automatic circuit protection in response to predetermined overcurrent conditions, which may be selected by the user within a certain range and input to the device a local or remote user interface, or otherwise pre-programmed into the device. The device 300 may operate according to specified time-current characteristics suitable to provide adequate protection for connected loads, including but not necessarily limited to characteristics required for listing as a UL 489 circuit breaker in contemplated embodiments.

Figure 11:
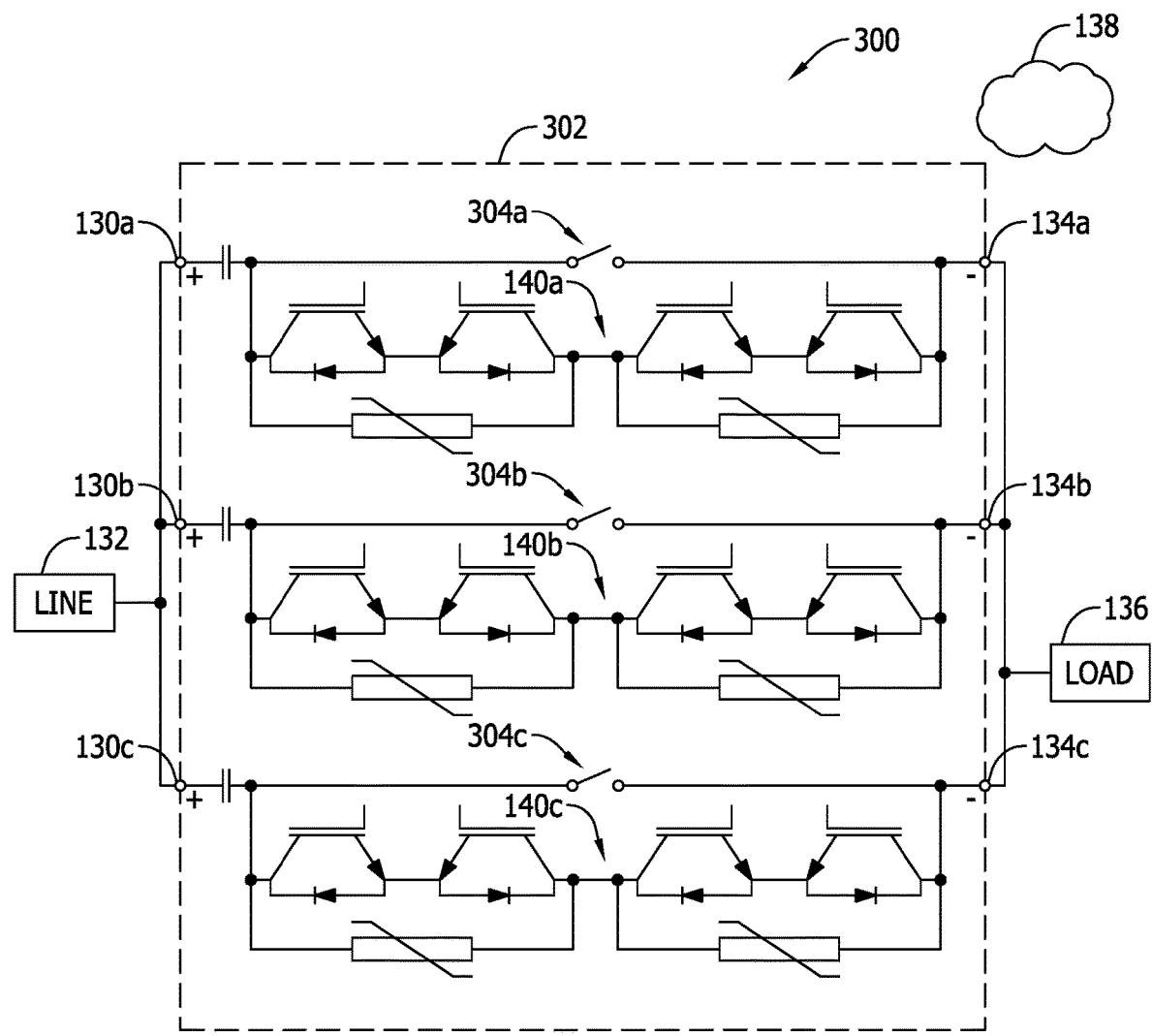
FIG. 11 is a simplified schematic diagram of the circuit protection device shown in FIG. 10 in an exemplary hybrid configuration.

FIG. 11 is a simplified schematic diagram of the circuit protection device 130 in an exemplary hybrid configuration. The device 300 includes input terminals 130*a*, 130*b*, 130*c* each connected to one phase of a three phase power supply indicated as line-side circuitry 132 via connecting cables, conduits, or wires. The device 300 further includes output terminals 134*a*, 134*b*, 136*c* each connected to load-side circuitry 136 such as motors, fans, lighting devices, and other electrical equipment in an industrial facility wherein ignitable gas, vapors or substances may be airborne as indicated at 138.

In between each pair of input terminals 130*a*, 130*b*, 130*c* and output terminals 134*a*, 134*b*, 136*c* are mechanical circuit breakers 304*a*, 304*b*, 304*c* and parallel connected solid state switch devices arranged as indicated at 140*a*, 140*b* and 140*c*. The exemplary solid state switch arrangement 140*a*, 140*b*, 140*c* includes series connected pairs of insulated-gate bipolar transistors (IGBTs) with each pair including a varistor element connected in parallel to the IGBTs as described above. While exemplary solid state switching arrangements are shown and described, others are possible to achieve solid state switching functionality in an arc-less manner. As discussed above, the solid state switching devices operate in an arc-less manner and therefore do not themselves present a risk of ignition insofar as arcing is concerned in the hazardous environment.

The combination of the mechanical circuit breakers 304*a*, 304*b*, 304*c* and the solid state switching arrangements 140*a*, 140*b* and 140*c* can improve response times of the device 300 relative to that of the device 100. The mechanical circuit breakers 304*a*, 304, 304*c* however, operate with mechanical switch contacts and accordingly deserve some attention to a hazardous location application as arcing can be an ignition source. The solid state switching arrangements 140*a*, 140*b* and 140*c* that are connected in parallel to the mechanical circuit breakers 304*a*, 304*b*, 304*c* can limit the current in mechanical circuit breakers 304*a*, 304, 304*c* in an overload or short circuit event to reduce intensity of any arc produced to a level below that required to present an ignition concern, or otherwise preclude arcing altogether.

Figure 12:
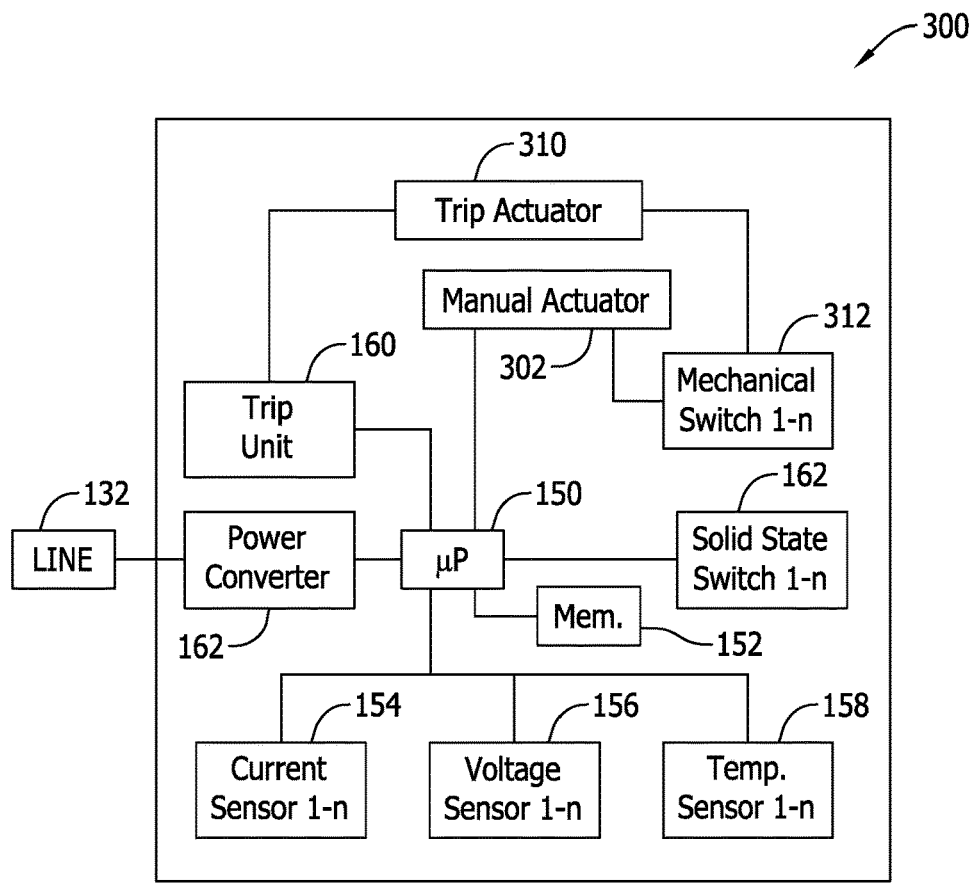
FIG. 12 is a block diagram of the circuit protection device shown in FIGS. 10 and 11.

FIG. 12 is a block diagram of the circuit protection device 300 including, in addition to the elements described above in the device 100, control inputs for the manual actuator 302, and a trip actuator 310 for operating the mechanical circuit breakers 312 including the mechanical switches. When predetermined overcurrents are detected, the trip unit 160 causes the trip actuator 310 to displace the movable switch contacts and open the circuit through the device 300. The trip actuator may be an electromagnetic member such as a solenoid that can simultaneously displace the switch contacts of each mechanical contact provided in the device 300, with the solid state switching arrangements 140*a*, 140*b* and 140*c* limiting the current as the displacement of the switch contacts occurs. The manual actuator 302 can thereafter be used to reset the device 300 by closing the mechanical contacts.

While an exemplary architecture has been described, it is understood that certain of the elements shown in FIG. 12 may be considered optional to provide more basic functionality, as well as additional elements could be added to realize still further sophistication and intelligence in the operation of the device 300.

Figure 13:
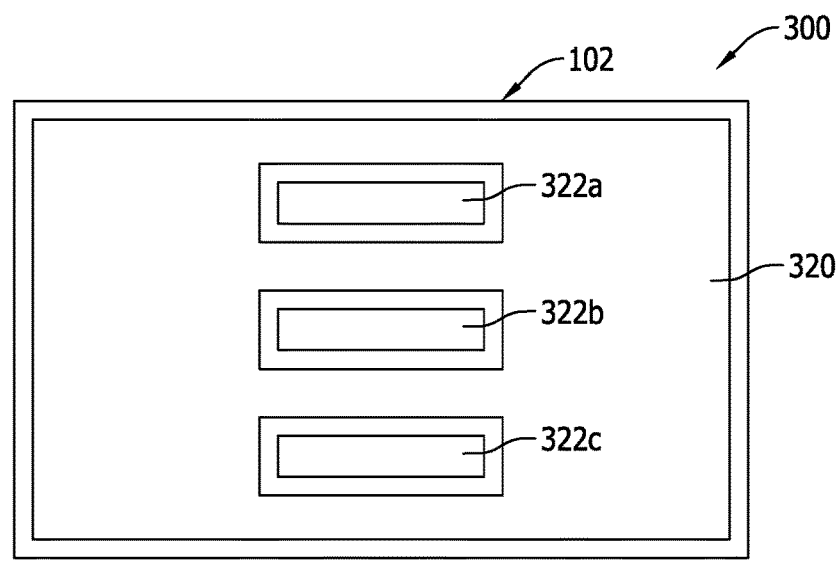
FIG. 13 diagrammatically illustrates thermal management features for the circuit protection device shown in FIGS. 10 through 12

FIG. 13 diagrammatically illustrates thermal management features for the circuit protection device shown in FIGS. 10 through 12. While as described above the hybrid device 300 is capable of operating in an arc-less manner, but as arcing can depend on the nature of an electrical fault and the voltage and current of the operating power system at the time of the electrical fault, additional considerations to address any arcing that is realized must be considered.

As shown in FIG. 13, and in addition to the thermal management features described above in relation to FIG. 9 and the device 100, the device 300 includes additional features to ensure that any arcing that occurs in operation of the mechanical circuit contacts is isolated from the ambient environment or otherwise is reduced to a level that is insufficient to cause ignition in an hazardous location. FIG. 13 illustrates the housing 102 of the device 300 defining a first or primary enclosure 320 and a series of secondary enclosures 322*a*, 322*b*, 322*c*. The secondary enclosures 322 serve to contain any electrical arcing within the secondary enclosure while ensuring that airborne ignitable gases, vapors or substances cannot reach the secondary enclosures 322*a*, 322*b*, 322*c* and therefore cannot be ignited by operation of the mechanical switch contacts.

In contemplated embodiments, the secondary enclosures 322*a*, 322*b*, 322*c* may be hermetically sealed chambers that include the respective switch contacts. The hermetically sealed chambers 322*a*, 322*b*, 322*c* are fluid tight such that any ignitable element of the hazardous location that may penetrate the housing 102 into the device housing 102 cannot enter the sealed chambers 322*a*, 322*b*, 322*c*. The hermetically sealed chambers may further be vacuum chambers or filled with inert gas that would reduce arcing intensity and duration, if not avoiding arcing altogether as the switch contacts are opened and closed. Each of the secondary enclosures 322a, 322b, 322c may be provided with additional insulation and material to contain any heat associated with arcing and localize it to the secondary enclosures 322a, 322b, 322c inside the larger enclosure 320. The enclosure within an enclosure construction of the housing 102 accommodates the other thermal management features described above, while addressing the additional concerns of the mechanical switch contacts in the hazardous location.

The secondary enclosures 322a, 322b, 322c may be fabricated from different materials than the rest of the housing 102, or a combination of materials that may be the same or different from the remainder of the housing. Metal and plastic materials may be utilized, for example, to construct the chambers while the primary enclosure and the rest of the housing may be entirely plastic. Numerous variations are possible in this regard. The secondary enclosures 322a, 322b, 322c may be prefabricated for assembly with the housing 102 at a separate stage of manufacture. The secondary enclosures 322a, 322b, 322c may enclose some or all of the mechanical circuit breaker mechanism, without impeding the path of motion of the switch contacts or their ability to move. Encapsulant and filler materials may be provided on the inner and outer surfaces of the secondary enclosures 322a, 322b, 322c to provide still further variation in thermal performance, again without impeding the path of motion of the switch contacts or their ability to move to ensure reliably disconnect functionality when actuated manually to facilitate service of the electrical power system or automatically to protect the electrical loads connected through the device 100.

Either of the devices 100 or 300 may be safely used in IEC Zone 1 and NEC Division 2 hazardous locations, without explosion-proof enclosures. The built-in ignition protection features described above either eliminate ignition sources or reduce them to levels that are insufficient to cause ignition. The devices 100 or 300 are therefore sometimes referred to as being ignition-protected and therefore eliminate any need for an explosion-proof enclosure. As such, the devices 100 and 300 prevent the possible explosion that the explosion-proof enclosure conventionally exists to safely contain. The devices 100 and 300 can accordingly safely operate in hazardous locations and obviate costs and burdens of conventional explosion-proof enclosures while saving space in the electrical power system.

Figure 14:
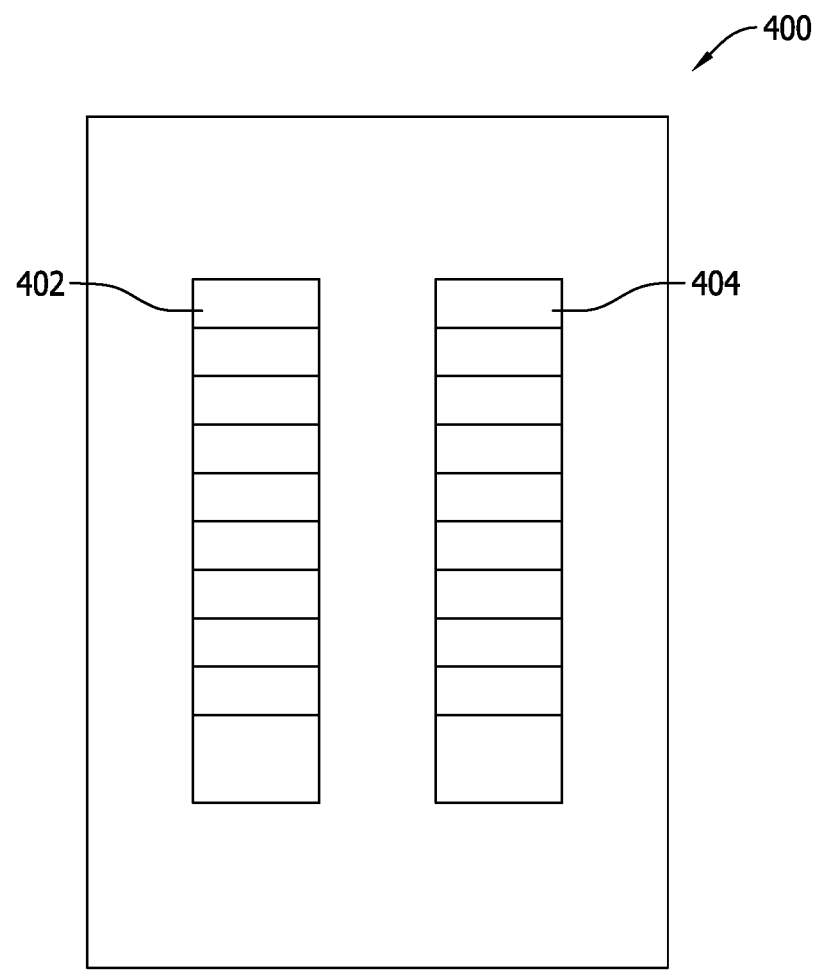
FIG. 14 illustrates an exemplary panelboard including compliant, hazardous location arc-less circuit protection devices.

FIG. 14 illustrates an exemplary panelboard 400 including compliant, hazardous location arc-less circuit protection devices including an array of devices 402, 404 arranged as two columns of devices with the devices 402, 404 located side-by-side in each column. The devices 402, 404 in each column include the devices 100 and 300 described above, and the devices 402, 404 may be represented in different ratings offering differing degrees of circuit protection to the various different loads as loads served by the panel and its various branches. The panelboard 400 typically includes its own enclosure, but it can be a standard environmental enclosure that is not designed to be explosion-proof. Because the devices 402, 404 are ignition protected, they can reside in the panel enclosure without conventional explosion-proof enclosures in the panel enclosure. The panel enclosure provides some protection to the devices 402, 404 from environmental conditions, but no separately provided explosion-proofing is needed for the panel by virtue of the ignition-protected devices 402, 404. Considering that known panelboards may accommodate up to 84 devices, elimination of the explosion-proof enclosures lowers costs substantially for operation of the devices in hazardous locations. The costs are multiplied even further for large electrical power systems including a number of panelboards located at different locations. In contemplated embodiments, the panelboard 400 may also be a single integrated circuit device with multiple programmable channels to accommodate a desired combination of single, two and three pole circuits.

The thermal management concerns are multiplied in such a panelboard installation including numerous devices 402, 404 operating simultaneously and in close proximity to one another. Heat effects can accumulate and adjacent devices may run hotter (i.e., with higher surface temperatures) than they would if used individually, or at least spaced farther apart from one another. The devices 402, 404 in the upper portions of the columns may further run hotter than devices 402, 404 in the lower portions of the disclosure as the heat rises from the lower situated devices 402, 404. In some instances then, active cooling features and systems may be advisable to avoid undesirable temperature effects on the operation some of the devices 402, 404 or to address elevated surface temperatures. As mentioned above, an active cooling system could be provided on or in relation to the panelboard to cool devices 402, 404 at a systems level, as opposed to individually. Variations and combinations of active cooling elements and systems are possible to achieve different cooling effects.

While a panelboard and panelboard enclosure are described above for the devices 400, 402, similar benefits may be realized in motor control centers and other locations in an electrical power system wherein circuit protection devices 402, 404 are likewise located in non-explosion-proof enclosures. Considering the sensors and intelligence provided in the devices 402, 404 and motor-inrush features provided in the devices 402, 404 additional motor startup components could be integrated in the design of the devices 402, 404 and provide a combination circuit protector/motor starter in a single package, as opposed to conventionally provided, separately packaged and series connected circuit protectors and motor starter assemblies that each require explosion-proof enclosures for use in hazardous locations. Other dual purpose or dual function devices 400, 402 are likewise possible that reduce costs of installing and servicing electrical power systems even further by reducing the number of devices that need to be acquired, installed, and serviced in the power system.

Figure 15:
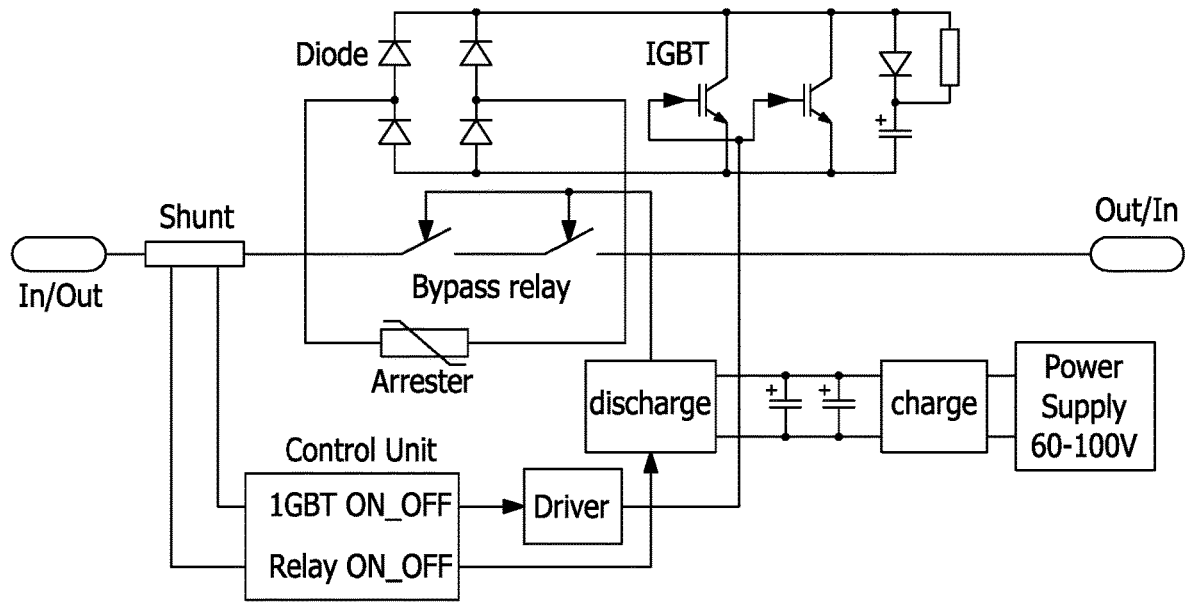
FIG. 15 is an exemplary circuit diagram of a power electronics topology for a circuit protection device having a hybrid configuration.
Figure 16:
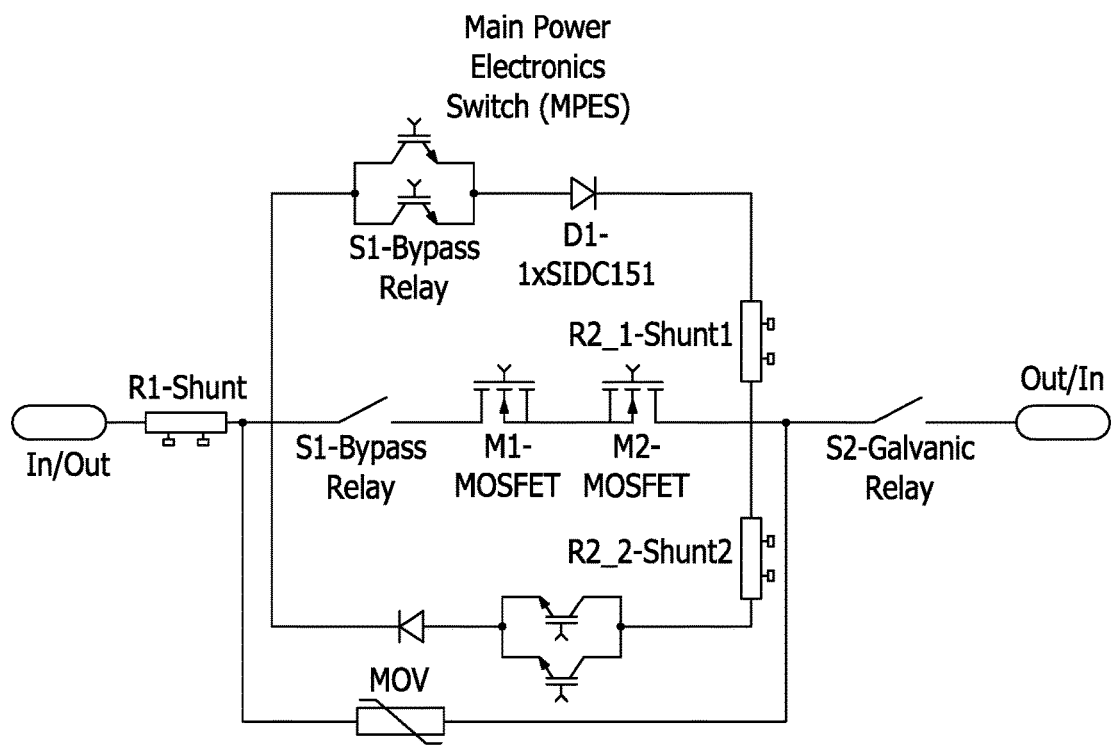
FIG. 16 is an alternative solid state switching device arrangement for a circuit protection device according to an embodiment of the present invention.
Figure 17:
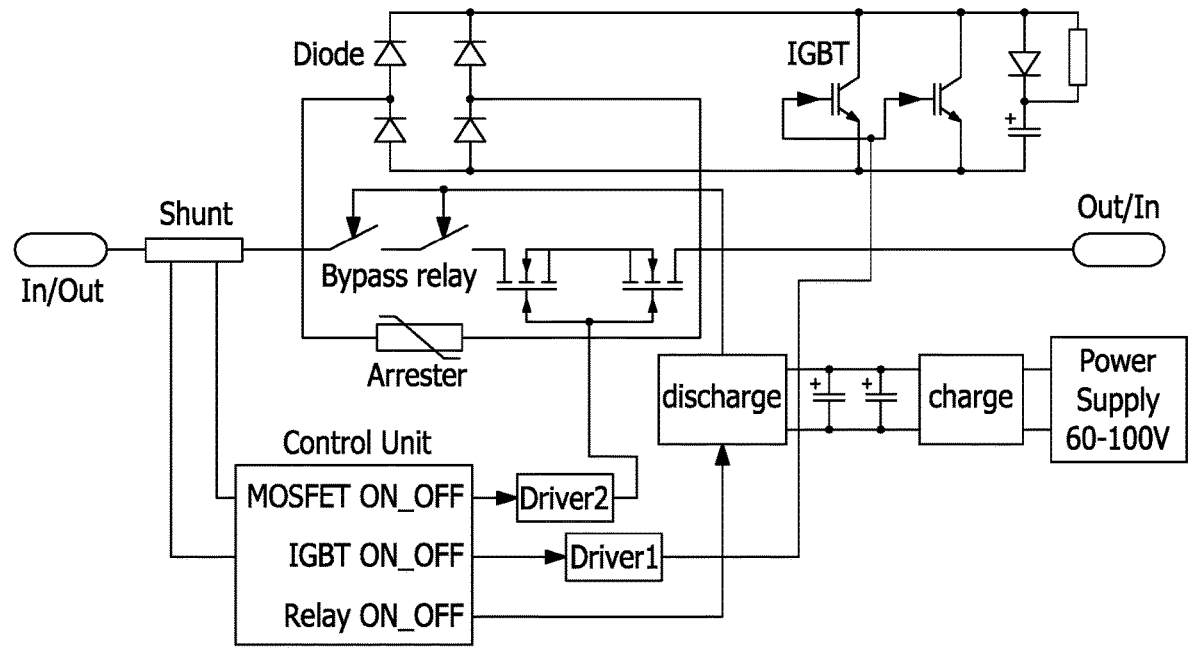
FIG. 17 is an exemplary circuit diagram of a power electronics topology for a circuit protection device having the hybrid configuration shown in FIG. 16.
Figure 18:
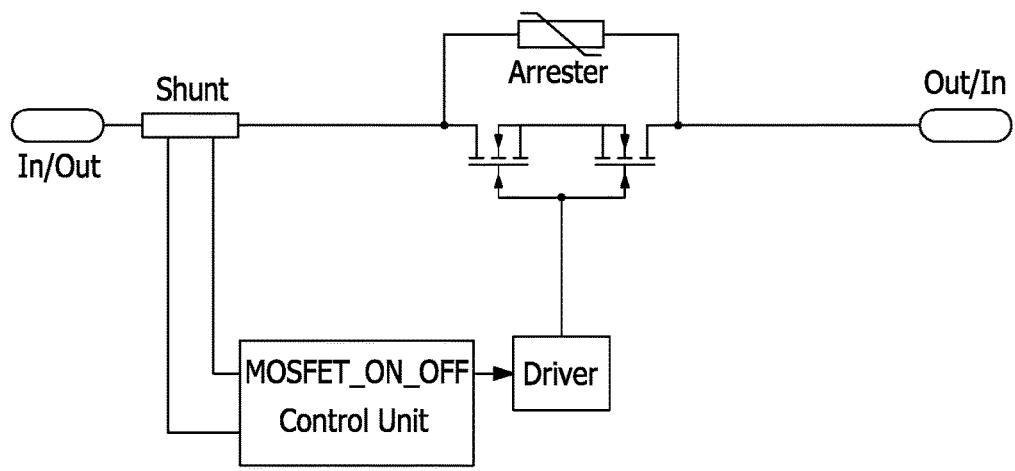
FIG. 18 is an exemplary circuit diagram of a power electronics topology for a circuit protection device having a solid state configuration.

FIGS. 15-19 illustrate additional circuit diagrams for exemplary solid state or hybrid devices such as those described above. FIG. 15 is an exemplary circuit diagram of a power electronics topology for a circuit protection device having a hybrid configuration. FIG. 16 is an alternative solid state switching device arrangement for a circuit protection device according to an embodiment of the present invention. FIG. 17 is an exemplary circuit diagram of a power electronics topology for a circuit protection device having the hybrid configuration shown in FIG. 16. FIG. 18 is an exemplary circuit diagram of a power electronics topology for a circuit protection device having a solid state configuration.

Of the circuits depicted in FIGS. 15 through 18, the circuit of FIG. 15, which may be implemented with solid state switch arrangement shown in FIG. 11, is operable with the lowest on-state losses. It may be disadvantaged, however, from the perspective of low-voltage arcing in the mechanical bypass switch while opening. Encapsulation materials and thermal management features for the bypass contact(s) provided would be advisable.

The arrangement and circuits shown in FIGS. 16 and 17 are beneficial in that the mechanical bypass switch can be opened while no current is flowing, and hence no arcing will result. The arrangement and circuits shown in FIGS. 16 and 17 generally entail higher conduction losses, a larger component count, an additional gate driver, and higher complexity than other arrangements. Additionally, the arrangement and circuits shown in FIGS. 16 and 17 may not easily meet requirements for short open time in certain applications.

The solid state circuit shown in FIG. 18 beneficially includes no moving mechanical parts and is operable in an arc free manner. It also is operable with a relatively simple switching algorithm, including motor soft-starting when desired. It operates with relatively high on-state losses, however.

While a variety of circuits and power electronic topology has been shown and described, others are possible and may be used in further embodiments of devices either in addition to or in lieu of the devices 100 and 300 including exemplary solid state and hybrid switch arrangements shown and described above. Solid state switching elements can be connected in series or in parallel to achieve desirable voltage rating scaling or desirable current rating scaling using modular arrangements.

Any of the solid state and hybrid switch arrangements shown and described above may include or be connected to line-side electrical fuses to enhance circuit protection assurance by addressing any deficiency of the solid state switching elements with respect to certain overcurrent conditions or to improve response times to certain operating conditions.

The arc-free operation, secure terminal assemblies and thermal management devices described above can easily be applied to realize circuit protection devices that are not circuit breaker devices, but are nonetheless ignition protected for use in IEC Zone 1 and NEC Division 2 hazardous locations, without explosion-proof enclosures. For example fusible switch disconnect devices discussed above that include mechanical switches in combination with fuses may be realized via one or more of the ignition proof features described above that renders them compliant for hazardous location use. Applying the arc-free operation, secure terminal assemblies and thermal management devices described, a solid state fusible switch disconnect device or a hybrid fusible switch disconnect device can easily be constructed with similar benefits, but offering a different degree of circuit protection.

Likewise, the arc-free operation, secure terminal assemblies and thermal management devices described above can easily be applied to realize switching devices that do not themselves provide circuit protection, but are nonetheless ignition protected for use in IEC Zone 1 and NEC Division 2 hazardous locations, without explosion-proof enclosures. For example, mechanical relay switches and contactors are known that provide disconnection functionality without capability to protect against overcurrent conditions. Applying the arc-free operation, secure terminal assemblies and thermal management devices described, a solid state relay device or a hybrid relay device, and a solid state contactor device or a hybrid contactor device can easily be constructed with similar benefits to those described above.

Ignition protected devices such as those described can be provided with any desired number of switching poles, including for example only single pole devices, two pole devices, three pole devices, and four pole devices to accommodate the needs of any type of power system, including single phase power systems, multiphase power systems and polyphase power systems, while universally providing ignition protection for use in IEC Zone 1 and NEC Division 2 hazardous locations.

Having described devices and applicable operating algorithms functionally per the description above, those in the art may accordingly implement the algorithms via programming of the controllers or other processor-based devices. Such programming or implementation of the concepts described is believed to be within the purview of those in the art and will not be described further.

The benefits and advantages of the inventive concepts are now believed to have been amply illustrated in relation to the exemplary embodiments disclosed.

An embodiment of an ignition protected switch device has been disclosed including a housing, a line-side terminal and a load-side terminal coupled to the housing, a bus structure in the housing and including at least one solid state switching element operable in an arc-free manner to connect the load-side terminal to the line-side terminal and disconnect the load-side terminal from the line-side terminal, and a controller operating the at least one solid state switching element in reference to a first operating temperature limit for the bus structure, thereby precluding the operating bus structure from being an ignition source in a hazardous location, whereby the ignition protected switch device is compliant for use in the hazardous location without requiring a separately provided explosion-proof enclosure.

Optionally, the housing may be configured and designed to operate at a surface temperature at or below a second temperature limit, with the controller being further configured to operate the at least one solid state switching element in reference to the second temperature limit, thereby precluding the housing from being an ignition source in the hazardous location. The ignition protected switch device may further include at least one mechanical switch contact in the bus structure, with the housing including a sealed internal enclosure containing the switch contact, thereby precluding the switch contact from being an ignition source in the hazardous location.

The line-side terminal and the load-side terminal may each include a secure cable terminal assembly including a locking element preventing a cable termination from loosening over time when subjected to thermal cycling or vibration, thereby precluding the terminal assembly from being an ignition source in the hazardous location. The secure cable terminal assembly may include a lug terminal, and the locking element may be a spring element. The lug terminal may include a fastener, wherein the spring element acts upon the fastener to prevent the cable termination from loosening. The spring element may act internally to the box lug. The spring element may be one of a coil spring or a spring plate. The secure terminal assembly may also include a lever, with the spring element acting on an end of the lever.

The line-side terminal and the load-side terminal may be either a plug or socket which connects to a cable. The plug or socket may provide a reject feature for an incompatible switch device. The controller may be further configured to operate the at least one solid state switching element to effect a hot swap feature for the ignition protected switch device.

The ignition protected switch device may include a display. The ignition protected switch device may also include a toggle switch, with the controller is further configured to operate the at least one solid state switching element in response to the toggle switch. The ignition protected switch device may also include an active cooling element, or a passive cooling element. A varistor connected in parallel to the at least one solid state switching element. The controller may be configured to provide motor starter and overload control. The device may be configured as a solid state circuit breaker, or may be configured as a hybrid circuit breaker.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An ignition protected switch device comprising:
a housing;
a line-side terminal and a load-side terminal coupled to the housing;
a bus structure in the housing and including at least one mechanical switch contact and at least one solid state switching element operable in an arc-free manner to connect the load-side terminal to the line-side terminal and disconnect the load-side terminal from the line-side terminal; and
a controller operating the at least one solid state switching element in reference to a first operating temperature limit for the bus structure, thereby precluding the operating bus structure from being an ignition source in a hazardous location;
wherein the housing is configured and designed to operate at a surface temperature at or below a second temperature limit and wherein the controller is further configured to operate the at least one solid state switching element in reference to the second temperature limit, thereby precluding the housing from being an ignition source in the hazardous location; and
wherein the housing includes a sealed internal enclosure containing the mechanical switch contact, thereby precluding the switch contact from being an ignition source in the hazardous location;
whereby the ignition protected switch device is compliant for use in the hazardous location without requiring a separately provided explosion-proof enclosure.

2. The ignition protected switch device of claim 1, wherein the line-side terminal and the load-side terminal each comprise a secure cable terminal assembly including a locking element preventing a cable termination from loosening over time when subjected to thermal cycling or vibration, thereby precluding the secure terminal assembly from being an ignition source in the hazardous location.

3. The ignition protected switch device of claim 2, wherein the secure cable terminal assembly further includes a lug terminal and wherein the locking element is a spring element.

4. The ignition protected switch device of claim 3, wherein the lug terminal further comprises a fastener, and wherein the spring element acts upon the fastener to prevent the cable termination from loosening.

5. The ignition protected switch device of claim 4, wherein the lug terminal is a box lug, and wherein the spring element acts internally to the box lug.

6. The ignition protected switch device of claim 4, wherein the spring element is one of a coil spring or a spring plate.

7. The ignition protected switch device of claim 3, wherein the secure terminal assembly further comprises a lever, the spring element acting on an end of the lever.

8. The ignition protected switch device of claim 1, wherein the line-side terminal and the load-side terminal comprises either a plug or socket which connects to a cable.

9. The ignition protected switch device of claim 8, wherein the plug or socket provides a reject feature for an incompatible switch device.

10. The ignition protected switch device of claim 8, wherein the controller is further configured to operate the at least one solid state switching element to effect a hot swap feature for the ignition protected switch device.

11. The ignition protected switch device of claim 1, further comprising a display.

12. The ignition protected switch device of claim 1, further comprising a toggle switch, wherein the controller is further configured to operate the at least one solid state switching element in response to the toggle switch.

13. The ignition protected switch device of claim 1, further comprising an active cooling element.

14. The ignition protected switch device of claim 1, further comprising a passive cooling element.

15. The ignition protected switch device of claim 1, further comprising a varistor connected in parallel to the at least one solid state switching element.

16. The ignition protected switch device of claim 1, wherein the controller is further configured to provide motor starter and overload control.

\* \* \* \* \*